(12) United States Patent
Asai et al.

(10) Patent No.: US 6,318,207 B1
(45) Date of Patent: Nov. 20, 2001

(54) CONNECTING DEVICE FOR CONTROL CABLE

(75) Inventors: Seiji Asai, Okazaki; Takashi Ikeda, Nagoya, both of (JP)

(73) Assignee: Nisshinbo Industries, Inc., Nagoya (JP)

(*) Notice: Subject to any disclaimer, the term of this patent is extended or adjusted under 35 U.S.C. 154(b) by 0 days.

(21) Appl. No.: 09/541,034

(22) Filed: Mar. 31, 2000

(30) Foreign Application Priority Data

Apr. 1, 1999 (JP) .................................................. 11-094650
Feb. 16, 2000 (JP) .................................................. 12-037947

(51) Int. Cl.$^7$ ................................. F16C 1/14; F16D 65/14
(52) U.S. Cl. .................... 74/502.6; 74/500.5; 188/106 A
(58) Field of Search ............................... 74/502.4, 502.6, 74/500.5; 188/106 A, 325, 78, 331

(56) References Cited

U.S. PATENT DOCUMENTS

| | | | |
|---|---|---|---|
| 3,064,767 | * 11/1962 | Wieger | 188/106 A |
| 3,661,233 | * 5/1972 | Margetts et al. | 188/106 A |
| 5,137,120 | * 8/1992 | Barbosa | 74/502.6 X |
| 5,720,367 | * 2/1998 | Evans | 74/502.4 X |
| 6,105,732 | * 8/2000 | Venetos | 74/502.6 X |

* cited by examiner

Primary Examiner—Mary Ann Green
(74) Attorney, Agent, or Firm—Young & Thompson

(57) ABSTRACT

A device for detachably connecting an end fitting of a control cable with a control lever in an operating device is composed in such manner that it makes the operating device to be more short and workability of cable connection to be enhanced. The operating device consists of a strut and a control lever which are pivotally journalled to each other. A end fitting of a control cable is engaged with a free end of the control lever, which free end is bifurcated by means of planar members spaced from each other so as to define a gap. In order to engage the end fitting with the free end of the control lever, the end fitting is set so that its long side is parallel with the planar members and then passed through the gap. Thereafter, the end fitting is rotated around the cable axis by an angle of 90 deg. and the cable is pulled to engage with the free end of the control lever.

14 Claims, 13 Drawing Sheets

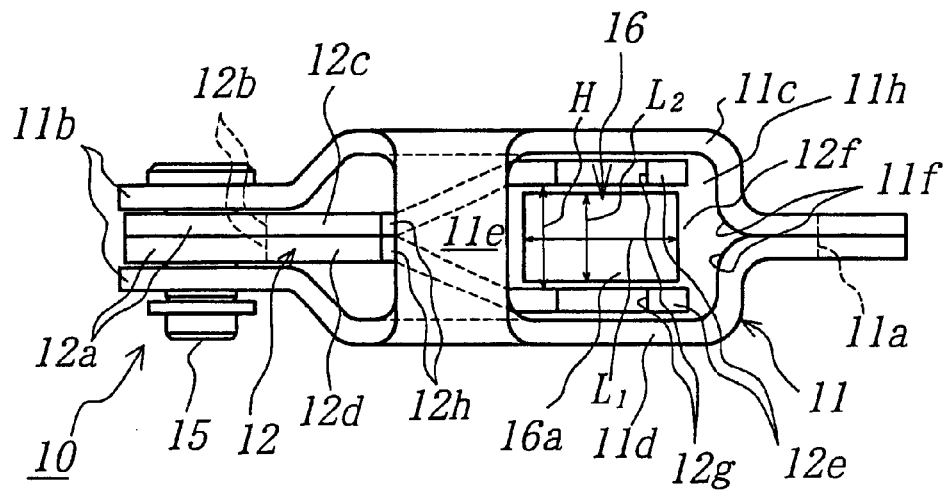

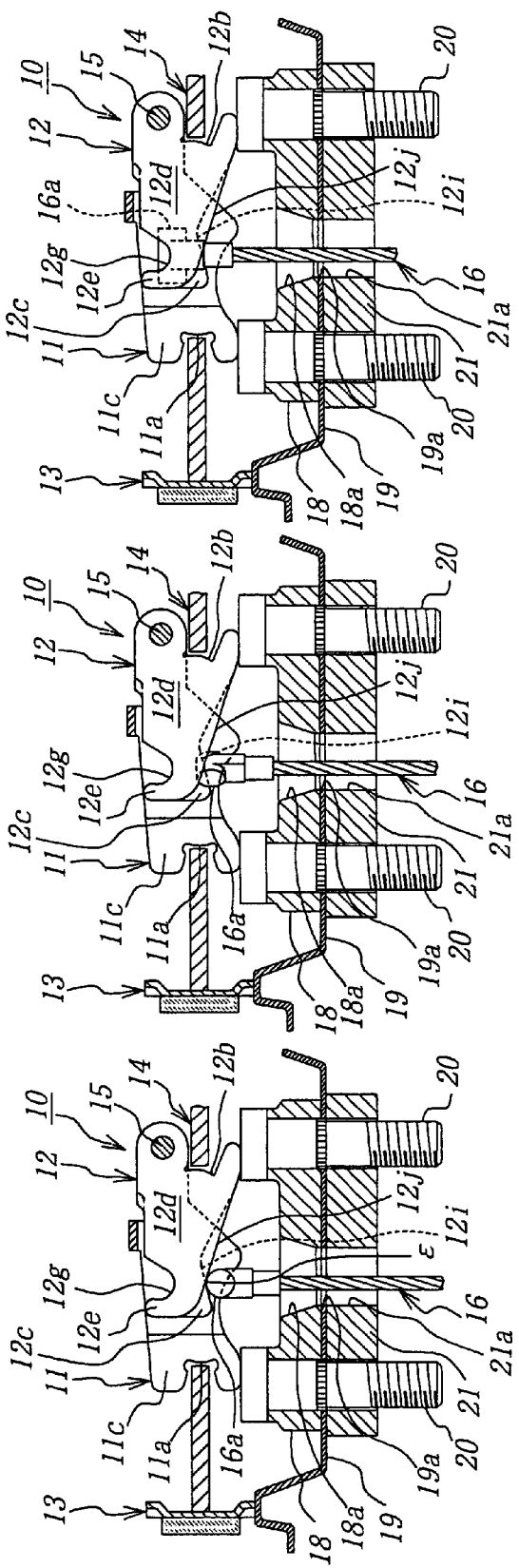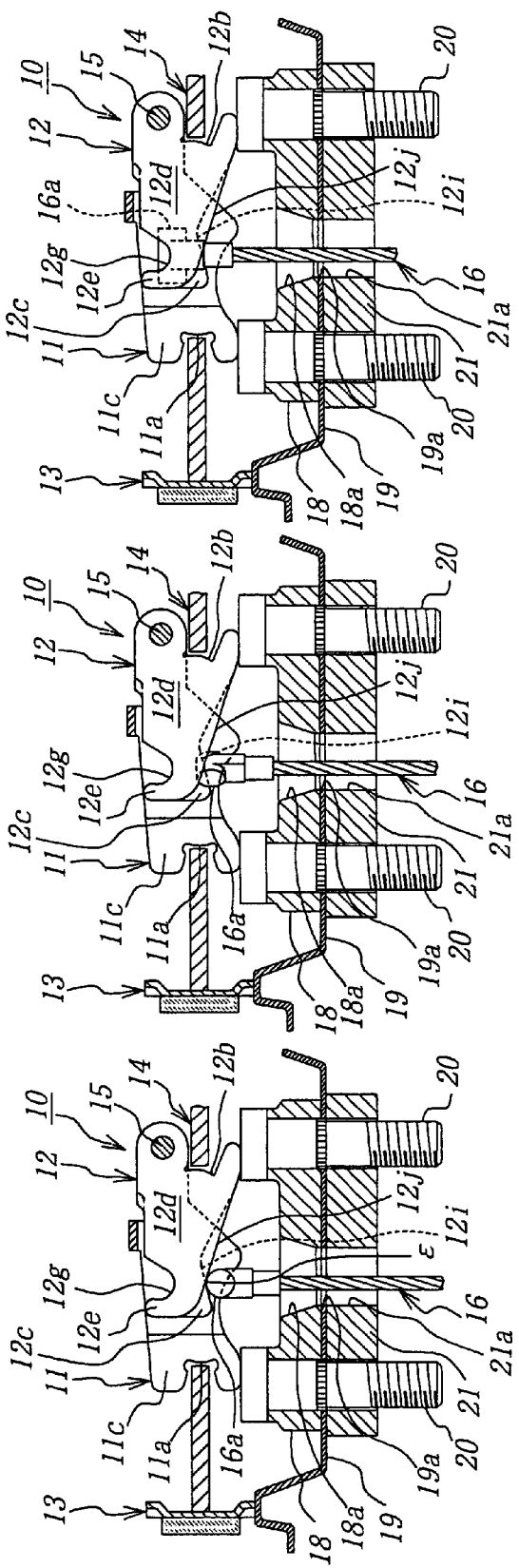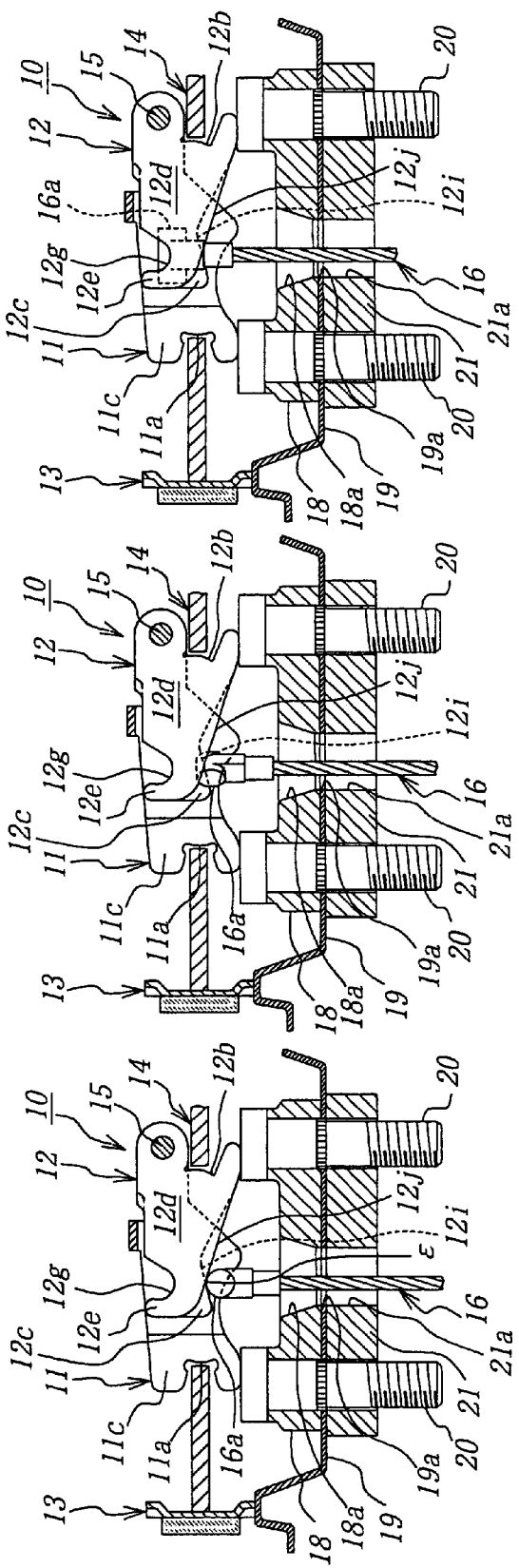

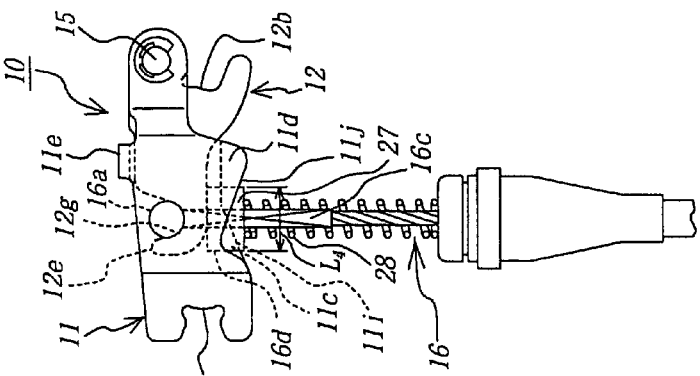
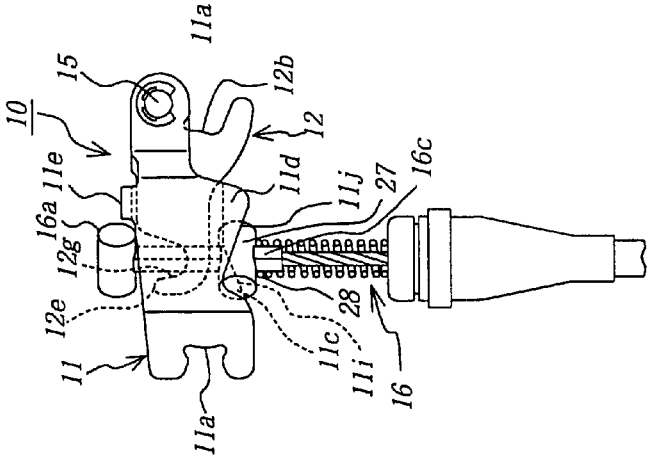
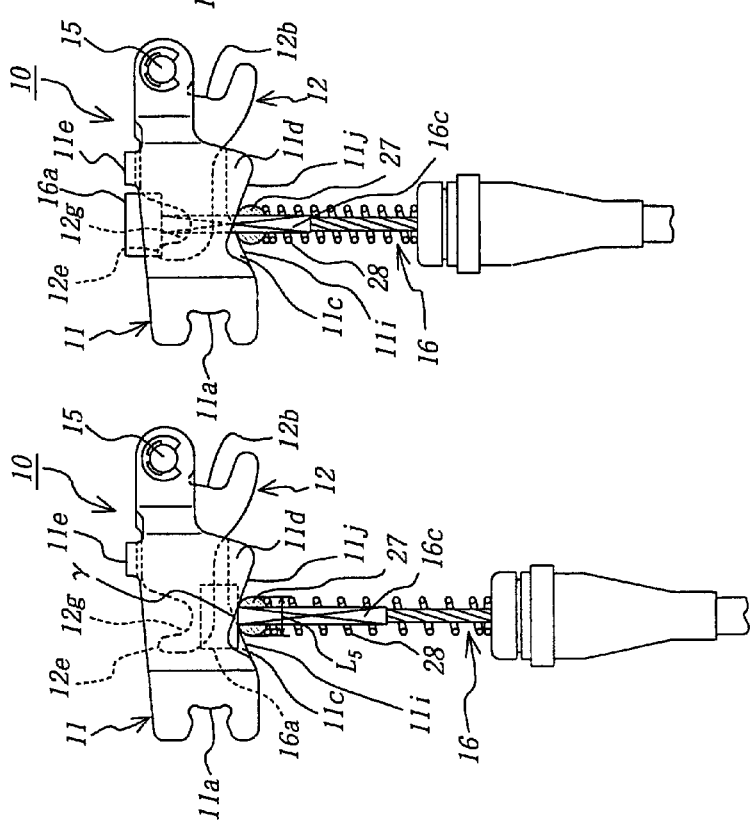

CONNECTING DEVICE FOR CONTROL CABLE

BACKGROUND OF THE INVENTION

1. Field of the Invention

The present invention relates to a device for operating a pair of members to be operated, such as brake shoes in a drum brake, so as to be mechanically moved these members away from each other through the manipulation of a control lever, and in more detail, a device for detachably connecting a control cable to a free end of the control lever in this device.

2. Description of the Related Art

As to a control cable connecting device for the above mentioned operating device, there has been known, for example, a device as shown in FIGS. 16(a) and 16(b) for detachably connecting a brake cable with a free end of a control lever for operating a drum brake, which is disclosed in U.S. Pat. No. 5,311,793.

Referring to FIGS. 16(a) and 16(b), there are shown a pair of brake shoes 1, 2 as members to be operated, a pressing bracket 3, a control lever 4, and a brake cable 5 as a control cable, which are correlated with one another as explained as follows, so as to constitute an operating device 6 for a drum brake.

The pressing bracket 3 is formed at its one end with a cut-out 3a to which one of the brake shoes 1 is engaged, and the pressing bracket 3 is provided at the other end with the control lever 4 pivotally journalled at its proximal end by means of a pivot pin 7, while the control lever 4 is formed at the proximal end with a cut-out 4a to which the other brake shoe 2 is engaged.

The operating lever 4 is further formed at its free end with cut-outs 4b to which an end fitting 5a of the brake cable 5 is engaged in a cable pulling direction.

With this arrangement, when a cable pulling force is inputted to the control lever 4 through the brake cable 5, in the direction indicated by the arrow W, the control lever 4 is rotated around the pivot pin 7 in the corresponding direction to push the brake shoe 2 leftward in the figure.

Meanwhile, the above mentioned rotation of the control lever 4 around the pivot pin 7 applies a reaction force to the pressing bracket 3 through the intermediary of the pivot pin 7, and accordingly, the pressing bracket 3 is pushed rightward in the figure together with the brake shoe 1.

The brake shoes 1, 2, as a result of the above mentioned operation of moving away from each other thereof, are pressed against the inner peripheral surface of a brake drum which is not shown, and accordingly, a braking operation can be carried out.

By the way, the operating device 6 for a drum brake is preferably constituted in such manner that the brake cable 5 can be engaged with or disengaged from the cut-outs 4b of the control lever 4 while the drum brakes are incorporated in a use condition, and accordingly, the operating device 6 is further incorporated therein additionally with the following arrangement.

That is, as clearly shown in FIG. 16(b), the pressing bracket 3 is bifurcated, except the end part where the cut-out 3a is formed, so as to have a space which is defined by a pair of opposed leg parts 3b, 3c and an inner end wall 3d, in which space the control lever 4 is accommodated.

Further, the control lever 4 is also bifurcated, except the proximal end in which the pivot pin 7 and the cut-out 4a exist, so as to define a space between a pair of opposed leg parts 4c, 4d, though which space the brake cable 5 can pass.

However, the distance between the pair of opposed leg parts 4c, 4d is selected such that the end fitting 5a of the brake cable 5 cannot pass through the space between the opposed leg parts 4c, 4d, and the opposed leg parts 4c, 4d are formed respectively with the above mentioned cut-outs 4b for engaging the end fitting 5a of the control cable 5.

As clearly shown in FIG. 16(a), the distance between the free end face of the control lever 4 and the inner end wall 3d of the pressing bracket 3 is set to be such a size that the end fitting 5a of the control cable 5 can pass through a gap between the free end face of the control lever 4 and the inner end wall 3d of the pressing bracket 3, and a V-shaped leaf spring 8 is interposed so as to block the above gap, one leg part 8a of which V-shaped leaf spring 8 being made into close contact with the inner end wall 3d.

The other leg part 8b of the V-shaped leaf spring 8 is made into close contact with the free end face of the control lever 4 to define a wedge-like space 9 between the leg part 8b of the V-shaped leaf spring 8 and the free end face of the control lever 4, which wedge-like space 9 guides the end fitting 5a of the brake cable 5 upon insertion which will be explained hereinafter.

When the brake cable 5 is to be engaged the free end of the control lever 4, the end fitting 5a of the brake cable 5, as indicated by the two-dot chain line in FIG. 16(a), is at first inserted into the above mentioned wedge-like space 9 from the outside of the drum brake, and then, the brake cable 5 and its end fitting 5a are pushed further as indicated by the arrow α.

At this time, the end fitting 5a is further advanced while being supported against the free end face of the control lever 4 and elastically deforming the sprig leg part 8b of the V-shaped leaf spring 8 in a direction indicated by the arrow β. When the end fitting 5a overrides the free end face of the control lever 4, the end fitting 5a is pushed by elastic restoration of the spring leg part 8b in a direction reverse to the direction indicated by the arrow β so that the end fitting 5a is engaged with the cut-outs 4b.

It is noted that this elastic restoration of the spring leg part 8b can prevent the end fitting 5a of the brake cable 5 from disengaging from the free end of the control lever 4.

When the brake cable 5 is to be removed, the spring leg part 8b of the V-shaped leaf spring 8 is elastically deformed in the direction indicated by the arrow β from the outside of the drum brake with use of a suitable tool, and in this condition, in reverse order of the above mentioned steps, the end fitting 5a of the brake cable 5 is disengaged from the cut-outs 4b, and then the brake cable 5 is pulled out of the drum brake with its end fitting 5a.

By the way, in the above mentioned conventional device for connecting the control cable for the drum brake, since the end fitting 5a of the brake cable is allowed to pass through the gap between the free end face of the control lever 4 and the inner end wall 3d of the pressing bracket 3 so as to engage or disengage the brake cable 5, and further, since it is necessary to normally block this gap with the V-shaped leaf spring 8 in order to prevent the end fitting 5a of the brake cable 5 from disengaging from the free end of the control lever 4, the gap between the free end face of the control lever 4 and the inner end wall 3d of the pressing bracket 3, as indicated by A in FIG. 16(a), should be set to a size which is obtained by adding gap required for passing of the end fitting 5a to the value twice as large as the thickness of the V-shaped leaf spring 8. Accordingly, there has been a problem such that the overall length of the operating device 6 becomes longer, and further, there has been a problem such that additional components including the V-shaped leaf spring 8 should be incorporated to be economically disadvantageous.

Furthermore, the brake cable 5 is likely to buckle when the brake cable 5 is pushed into the wedge-like space 9 for engaging the end fitting 5a of the brake cable 5 to the free end of the control lever 4, and accordingly, since careful working is required in order to prevent occurrence of this buckling, and further, since it is required to elastically deform the spring leg part 8b of the V-shaped leaf spring 8 when the end fitting 5a of the brake cable 5 is detached from the free end of the control lever 4, as well as this working requiring a tool inserted from the outside of the drum brake, there has been inevitably presented such a problem that the engagement and the disengagement of the end fitting 5a of the brake cable 5 become more difficult.

SUMMARY OF THE INVENTION

It is an object of the present invention to solve such a problem that the overall length of the operating device become longer and as well such a problem that the engagement or the disengagement of the end fitting is of the control cable becomes more difficult, inherent to the above mentioned conventional device.

In order to accomplish this object, it is one aspect to provide a device for connecting a control cable for use in an operating mechanism in which one of members to be operated is engaged with one end of a strut, and the other one of members to be operated is engaged with a control lever pivotally journalled to the other end of the strut, in the vicinity of the pivotally journalled portion of the control lever, an end fitting of the control cable being engaged with a free end of the control lever in a cable pulling direction, and the control lever and the strut being rotated relative to each other around the pivotally journalled portion by pulling the control cable, so as to move said both members to be operated, away from each other, characterized in that:

said end fitting of the control cable having such a shape that the length of one side is longer than that of the other, as viewed in the longitudinal direction of the control cable;

said free end of the control lever having a gap through which the length of said other side of the end fitting of the control cable can pass but the length of said one side thereof cannot pass; and the end fitting of the control cable is passed through the gap in a direction reverse to the cable pulling direction, and then, the control cable is rotated by an angle of 90 deg. around its longitudinal axis so as to engage the end fitting of the control cable with the free end of the control lever in the cable pulling direction.

With this arrangement, the end fitting of the control cable is passed through the gap which is formed in the control lever itself as mentioned above, so as to enable the end fitting of the control cable to be engaged with or disengaged from the free end of the control lever.

Accordingly, it is possible to eliminate the necessity of defining a gap between the free end face of the control lever and the inner end wall of the strut, through which gap the end fitting of the control cable is passed.

Further, it is possible to eliminate the necessity of incorporating an additional component for blocking the gap in order to prevent the end fitting from disengaging out of the free end of the control lever.

For the above it is possible to solve such a problem that the overall length of the operating device becomes longer and such a problem that it is economically disadvantageous, inherent to the conventional device.

Further, when the end fitting of the control cable is connected to or detached from the operating device, it is only required to insert or pull the control cable with its end fitting into or from the operating device, and to rotate the control cable around its longitudinal axis. Accordingly, no working of elastically deforming components other than the control cable and the end fitting thereof, is required, thereby it is possible to exhibit such functional effects that the engagement and the disengagement of the end fitting of the control cable can be simplified.

According to another aspect of the present invention, it is preferable that said control lever is composed of a pair of planar members opposed to each other, which planar members are coupled with each other at a portion corresponding to the proximal end of the control lever to be pivotally journalled to said other end of the strut, and which planar members are spaced from each other at a portion corresponding to the free end of the control lever so as to define said gap.

With this arrangement, even though the gap is formed in the control lever itself, it is possible to prevent the control lever from becoming expensive, thereby it is possible to exhibit the above mentioned functional effects without increasing the costs.

According to a further aspect of the present invention, it is preferable that said strut is provided with a control lever abutting part for limiting rotation of the control lever, relative to the strut, in the direction reverse to the cable pulling direction.

With this arrangement, even though the end fitting of the control cable abuts against the control lever in the operating device when the end fitting of the control cable intend to be passed through the gap in the control lever in the direction reverse to the cable pulling direction upon engagement of the end fitting with the free end of the control lever, the rotation of the control lever in the associated direction is limited by the control lever abutting part so as to eliminate necessary of retaining operation of the control lever and to be capable of enhancing the workability of cable connection.

According to a still further aspect of the present invention, it is preferable that said strut has opposed side walls between which the free end of said control lever is interposed on the opposite sides in the direction of the rotating axis of the control lever, and said strut has a bridging part connecting these opposed side walls, which bridging part serves as the said control lever abutting part.

With this arrangement, the control lever abutting part for limiting rotation of the control lever as mentioned above, can enhance the strength of the strut, whereby it is possible to enhance the reliability of the operating device.

According to a still further aspect of the present invention, it is preferable that said end fitting of the control cable is composed of a columnar member laid transversely and coupled to the end of the control cable, and the engaging face formed on the free end of the control lever so as to receive the end fitting of the control cable has a circular arc surface.

With this arrangement, the end fitting of the control cable can smoothly slide on the engage face of the free end of the control lever in the circular arc direction of the engage face so that no local bending stress is exerted to the control cable during rotation of the control lever by pulling the control cable, thereby it is possible to enhance the durability thereof.

According to a still further aspect of the present invention, it is preferable that outer side edges of opposed pieces defining the gap at the free end of said control lever, on the side in the cable pulling direction, are inclined in directions reverse to each other, so that said outer side edges of the opposed pieces at the free end of said control lever cross each other as viewed in the direction of the rotational axis of the control lever, whereby, even at a rotational position of the end fitting around the cable axis such that it interferes with said outer side edges of the opposed pieces, when the end fitting is pushed in the direction reverse to the cable pulling direction, the end fitting is subjected to a rotating force around the cable axis due to the inclination of said outer side edges so as to be set in rotational position at which the end fitting can pass through said gap.

With this arrangement, the end fitting of the control cable can be automatic-ally rotated in desired position at which the end fitting of the control cable can pass through the gap formed in the control lever itself by only pushing the end fitting of the control cable against said outer side edges of the opposed pieces of the control lever.

For the above it is possible to eliminate the necessity of working for setting the end fitting of the control cable to the above desired position upon insertion of the end fitting of the control cable into the gap at the free end of the control lever, thereby it is possible to enhance the workability for the connection of the control cable.

According to a still further aspect of the present invention, it is preferable that the position where the outer edges of the opposed pieces cross with each other as viewed in the direction of the rotational axis of the control lever, is aligned with the engaging position of the end fitting of the control cable with respect to the free end of the control lever in the axial direction of the cable.

With this arrangement, it is not necessary to displace the end fitting of the control cable transversely in order to align it with the engaging position at the free end of the control lever after the insertion of the end fitting of the control cable into the gap of the control lever, whereby it is possible to further enhance the workability for connection of the control cable.

According to a still further aspect of the present invention, it is preferable that said strut has opposed side walls between which the free end of the control lever is interposed on opposite sides in the direction of the rotational axis of the control lever, said control cable is provided with a retainer arranged to cross at right angle relative to the end fitting of the control cable as viewed in direction of cable axis, said retainer having a long side which corresponds to said one side of the end fitting of the control cable and which has a size that cannot pass through the gap between said opposed side walls of the strut, and having a short side which corresponds to said other side of the end fitting of the control cable and which has a size that can pass through said gap but cannot pass through the gap at the free end of the control lever, and said end fitting of the control cable is passed through the gap at the free end of the control lever in the direction reverse to the cable pulling direction, said retainer is urged to abut against the outer edges of the opposed side walls of the strut, and then the control cable is rotated around its longitudinal axis by an angle of 90 deg. to engage the end fitting of the control cable with the free end of the control lever in the cable pulling direction.

With this arrangement, the worker can sense, upon the abutment of the retainer against the outer edges of the opposed side walls of the strut, such a fact that the end fitting of the control cable has passed through the gap in the control lever itself, and the worker is able to sensibly knows such a condition that the end fitting of the control cable should be rotated around cable axis by an angle of 90 deg. in order to engage the end fitting of the control cable with the free end of the control lever.

According to a still further aspect of the present invention, it is preferable that the outer edges of the opposed side walls of the strut, on the side in the cable pulling direction, are inclined at a substantially middle portion between the opposite ends of the strut, in directions reverse to each other so as to cross one another as viewed in the direction of the rotational axis of the control lever, whereby, even at a rotational position around the cable axis such that the retainer interferes with the outer side edges of the opposed side walls of the strut, when the retainer is pushed in the direction reverse to the cable pulling direction, the retainer is subjected to a rotational force around the cable axis due to the inclination of said outer side edges of the opposed side walls of the strut so as to be fitted into said gap of the strut, whereby the end fitting of the control cable is set in rotational position at which it can be engaged with the free end of the control lever.

With this arrangement, the cooperation between the retainer and the inclined outer side edges of the opposed side walls of the strut makes it possible to automatically rotate the end fitting of the control cable around the cable axis by an angle of 90 deg. in order to engage with the free end of the control lever, when the end fitting of the control cable has passed through the gap at the free end of the control lever.

Accordingly, the retainer added for notifying the above mentioned pass of the end fitting of the control cable is possible to eliminate the necessity of rotation of the end fitting of the control cable after said pass of the end fitting, whereby it is possible to enhance the workability of connection of the control cable to the free end of the control lever.

According to a still further aspect of the present invention, it is preferable that the position at which the outer side edges of the opposed side walls of the strut cross each other as viewed in the direction of the rotational axis of the control lever is aligned with the engaging position of the end fitting of the control cable with respect to the free end of the control lever, in the axial direction of the cable.

With this arrangement, the rotation of the end fitting of the control cable due to the cooperation between the retainer and the inclined outer side edges of the opposed side walls of the strut is carried out at the aligned position in the axial direction of the control cable with the engaging position of the end fitting of the control cable and the free end of the control lever.

Accordingly, the end fitting of the control cable can be engaged with the free end of the control lever only by directly moving the end fitting of the control cable in the cable pulling direction without adjusting it in position transversely after the rotation of the end fitting of the control cable, whereby it is possible to further enhance the workability of the connection of the control cable.

According to a still further aspect of the present invention, it is preferable that said retainer is fitted on the control cable so as to be slidable in the axial direction of the cable while remaining the rotational position so as to be orthogonal to the end fitting of the control cable, and said retainer is urged toward the end fitting of the control cable.

With this arrangement, the free end of the control lever is interposed between the end fitting of the control cable and the retainer upon connection of the control cable to the free end of the control lever, and therefor, the completion of the connection of the control cable can be sensibly recognized due to abutting sound produced at this time, and further, the connection part can be prevented from rattling and disconnecting.

According to a still further aspect of the present invention, it is preferable that there is provided with a stopper against which the end fitting of the control cable abuts upon said passing of the end fitting of the control cable through the gap at the free end of the control lever, whereby the worker can sense the passing of the end fitting of the control cable.

With this arrangement, the worker is able to recognize such a fact that the end fitting of the control cable has passed through the gap, and accordingly, he can carry out, if necessary, a next working step of rotating the control cable around its longitudinal axis by an angle of 90 deg., or of engaging the end fitting of the control cable with the free end of the control lever by pulling the control cable and so forth.

According to a still further aspect of the present invention, it is preferable that said stopper is composed of an elastic stopper, whereby the end fitting of the control cable deforms the elastic stopper to be floated up from a stopper support portion formed on the strut, when the end fitting of the control cable is passed through said gap and abuts to the elastic stopper.

With this arrangement, when the control cable is rotated around its longitudinal axis by an angel of 90 deg., and then, the hand is released from the control cable to engage the end fitting of the control cable with the free end of the control lever, the elastic stopper abuts against the stopper support portion due to its elastic restoration to generate sound. A worker can sensibly recognize on the basis of this sound that the engagement of the end fitting of the control cable has been completed.

According to a still further aspect of the present invention, it is preferable that a receiving surface of said stopper for the end fitting of the control cable is formed into a twisted surface which can exert a rotational force around the cable axis to the end fitting of the control cable so that the end fitting of the control cable comes into a rotational position where it can be engaged with the free end of the control lever.

With this arrangement, the end fitting of the control cable is automatically rotated around the axis of the control cable by an angle of 90 deg. by said twisted surface of the stopper upon said insertion of the end fitting of the control cable, and accordingly, no working step of rotation of the end fitting of the control cable is required, thereby it is possible to further enhance the workability of the connection of the control cable to the free end of the control lever.

BRIEF DESCRIPTION OF THE DRAWINGS

FIG. 4 designates the progress of the connection of a control cable to the drum brake operating device:
   (a) is a plan view illustrating a condition just after the control cable with its end fitting has been inserted into the drum brake operating device; and
   (b) is a longitudinally sectional side view illustrating such a condition that the control cable with its end fitting has been inserted further into the drum brake operating device in the direction of the axis of the control cable;

FIG. 10 is longitudinally sectional side views showing the progress for the connection of the control cable according to the embodiment as shown in FIG. 9:
   (a) designates a condition when the end fitting of the control cable makes contact with the free end of the control lever;
   (b) designates a condition when entrance of the end fitting of the control cable into the gap of the free end of the control lever is started; and
   (c) designates a condition when the entrance of the end fitting of the control cable into the gap of the free end of the control lever is intermediary progressed.

FIG. 11 is side views illustrating a drum brake operating device incorporating a device for connecting a control cable according to a further another embodiment of the present invention:
   (a) designates a condition when entrance of the end fitting of the control cable into the free end of the control lever is started;
   (b) designates a condition just before the end fitting of the control cable is completely passed through the free end of the control lever;
   (c) designates a condition when the end fitting of the control cable has been completely passed through the free end of the control lever; and
   (d) designates such a condition that the end fitting of the control cable has been engaged with the free end of the control lever;

Figure 12A:
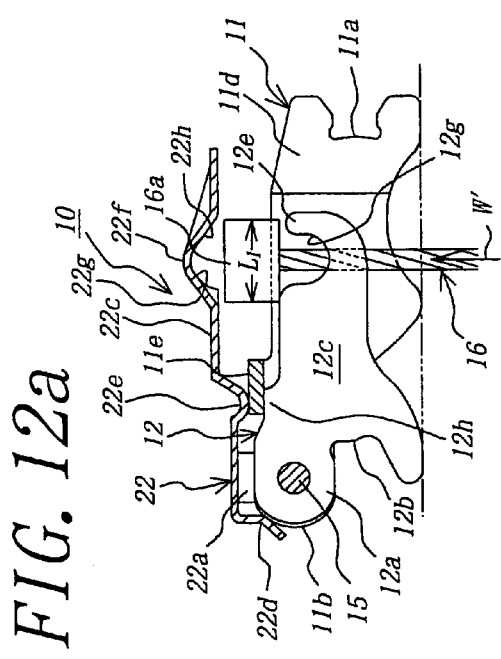
FIG. 12 is Longitudinally sectional side views illustrating a brake drum operating device incorporating a device for connecting a control cable according to a further another embodiment of the present invention;
   (a) shows a condition when the end fitting of the control cable has been completely passed through the free end of the control lever;
   (b) shows such a condition that the end fitting of the control cable has been received by a stopper;
   (c) shows such a condition that the end fitting of the control cable has been rotated by a rotational force around the cable axis from the stopper; and
   (d) shows a condition when the end fitting of the control cable is pulled in a cable pulling direction to be engaged with the free end of the control lever.
Figure 12B:
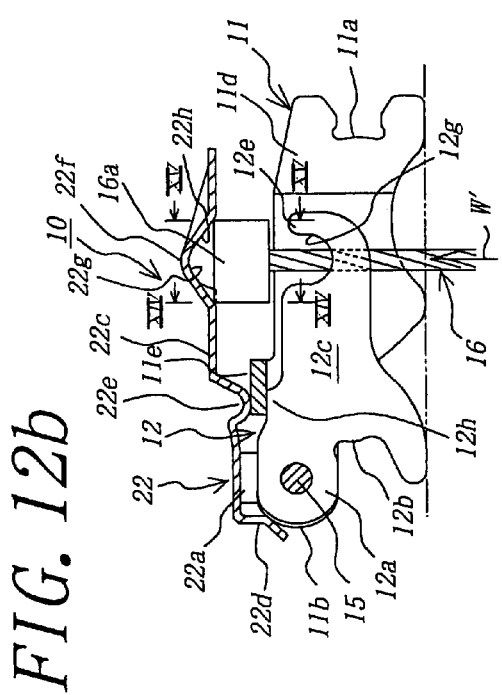
Figure 14:
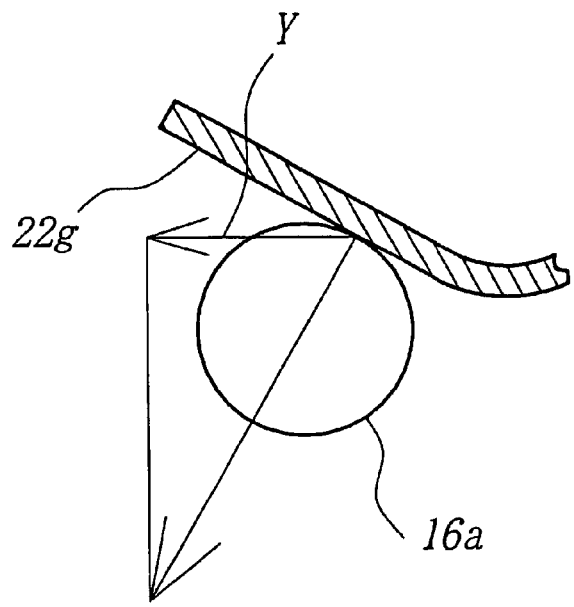
Figure 15:
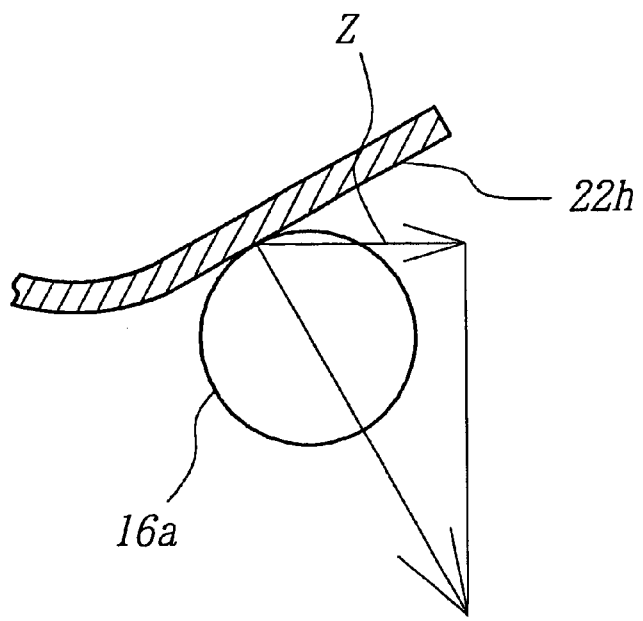
Figure 16A:
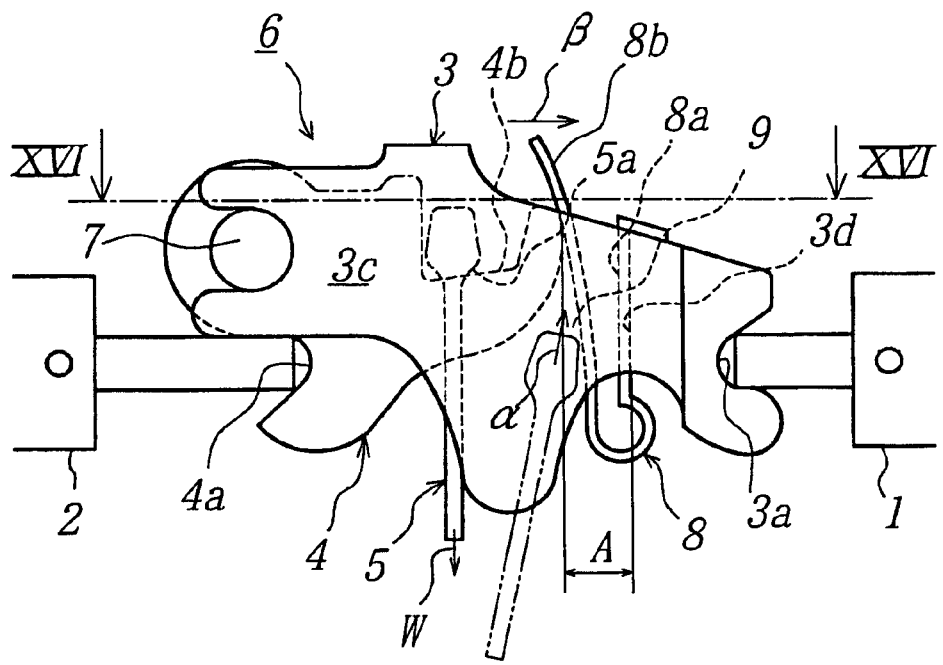

(a) shows the stopper together with the end fitting of the control cable which initially abuts against the stopper;

(b) shows the stopper together with the end fitting of the control cable while rotating by the stopper; and (c) shows the stopper together with the end fitting of the control cable which has been completely rotated;

FIG. 14 is a sectional view illustrating the stopper, as viewed in the direction of the arrow along line XIV—XIV in FIG. 12(b);

FIG. 15 is a sectional view illustrating the stopper, as viewed in the direction of the arrow along line XV—XV in FIG. 12(b); and FIG. 16 designates a drum brake operating device incorporating a conventional device for connecting a control cable:

(a) is a side view thereof; and (b) is a cross-sectional view as viewed in the direction of the arrow along line XVI—XVI in FIG. 16a.

DESCRIPTION OF THE PREFERRED EMBODIMENTS

Figure 1:
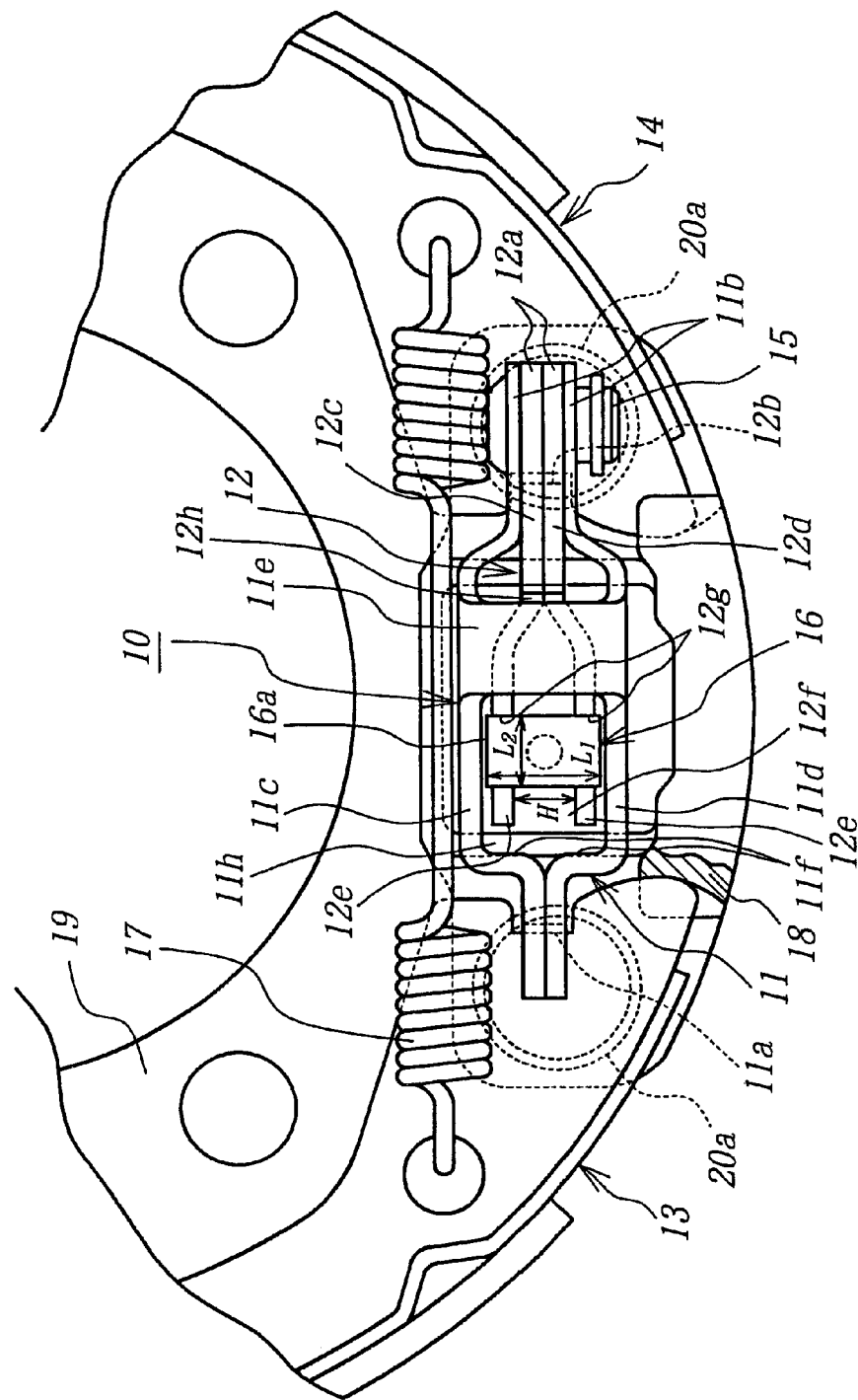
FIG. 1 is a plan view illustrating an essential part of a drum brake including a drum brake operating device connected a control cable according to an embodiment of the present invention.
Figure 2:
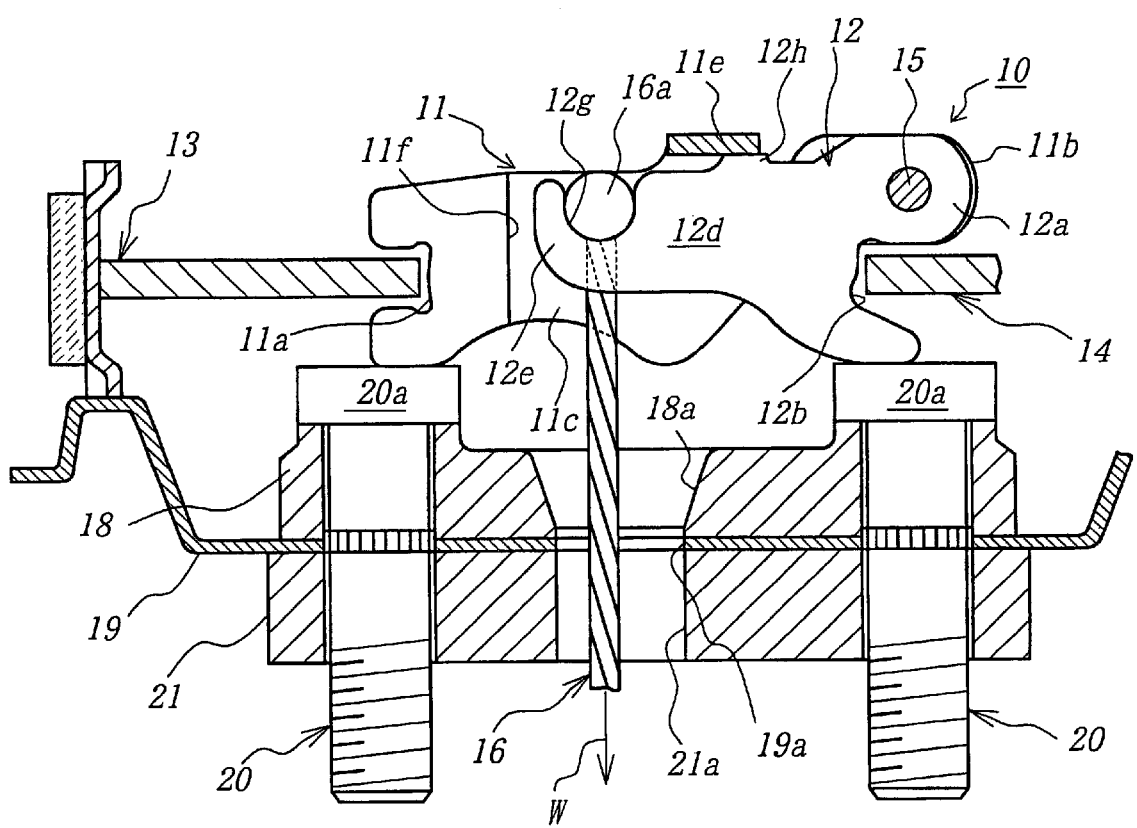
FIG. 2 is a longitudinally sectional side view illustrating the essential part of the drum brake in FIG. 1.

Referring now to the drawings, FIGS. 1 and 2 show a drum brake operating device 10 incorporating a device for connecting a control cable according to a preferred embodiment of the present invention, the drum brake operating device 10 being mainly composed of a strut 11 and a control lever 12.

Figure 3A:
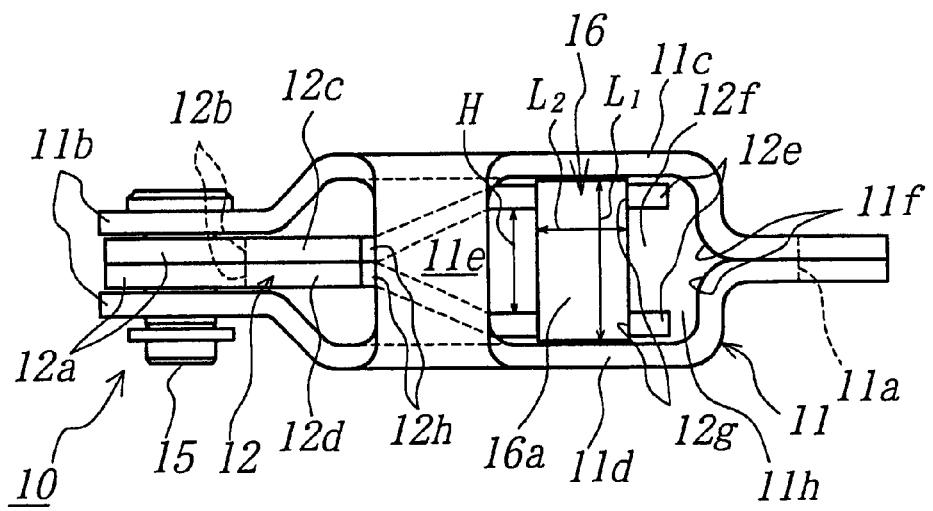
FIG. 3 designates only the drum brake operating device which is removed from the drum brake:
   (a) is a plan view thereof; and
   (b) is a longitudinal sectional side view thereof.
Figure 3B:
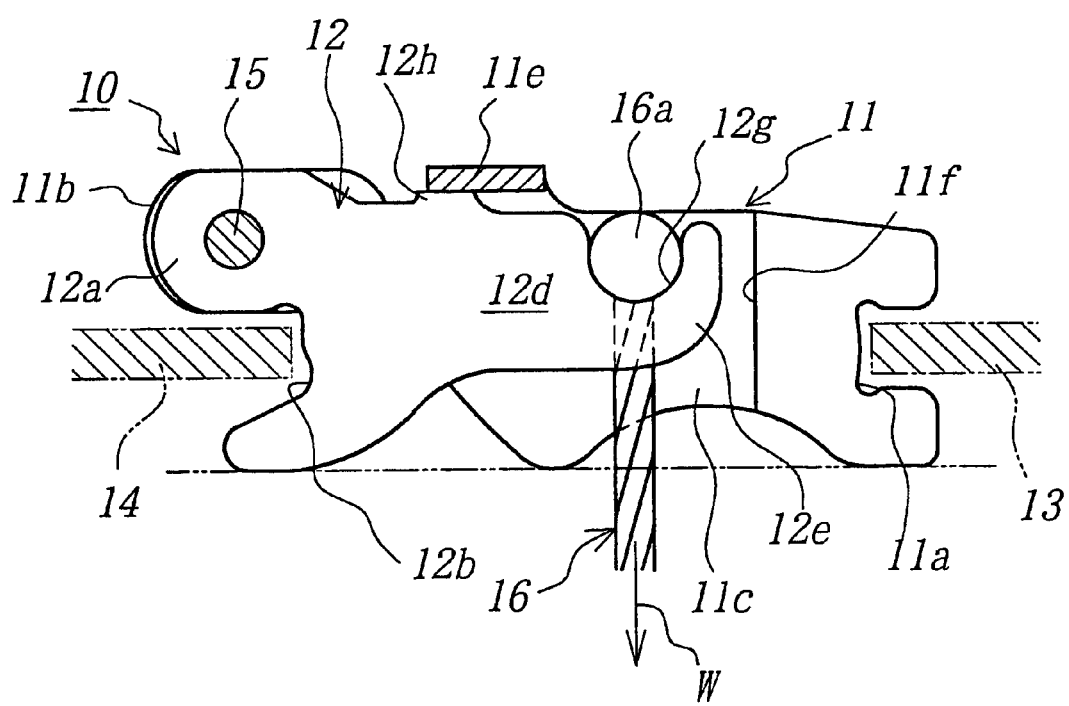
Figure 16B:
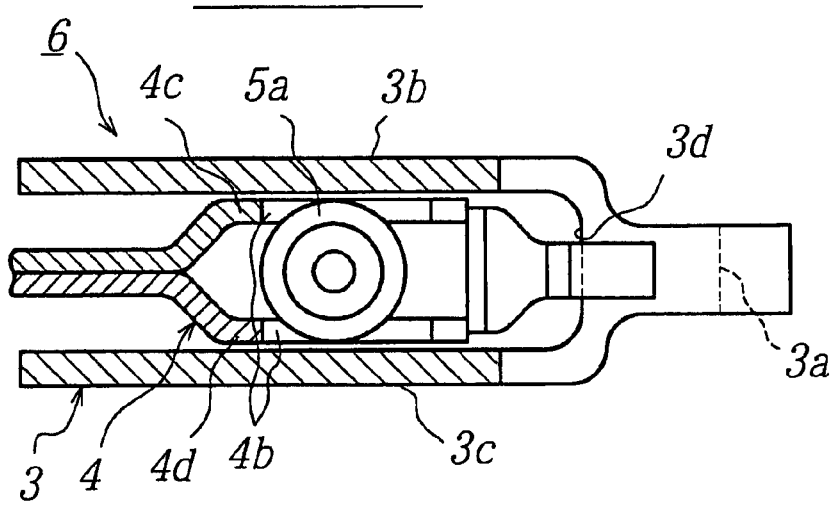

The strut 11 and the control lever 12 are more clearly shown in FIGS. 3(a) and 3(b) in which the operating device 10 is shown in condition inverted light and left thereof for the sake of convenience in comparison with the conventional structure shown in FIGS. 16(a) and 16(b).

The strut 11, as shown in FIGS. 1, 2 and 3(b), is arranged between operation ends of brake shoes 13, 14 as members to be operated, and the strut 11 is formed at its one end with a brake shoe engaging groove 11a for the one 13 of brake shoes 13, 14.

The control lever 12 is journalled at its proximal end 12a to the other end 11b of the strut 11 by means of a pivot pin 15, and the control lever 12 is formed with a brake shoe engaging groove 12b for the other 14 of the brake shoes 13, 14, which brake shoe engaging groove 12b is arranged in the vicinity of the journalled portion of the control lever 12.

The strut 11 will now be explained in more detailed. The strut 11 is formed of a single plate which is bent in form of a rectangular frame. This rectangular frame has side wall 11c and 11d opposed to each other, one 11c and the other 11d of which side walls 11c, 11d are made into close contact with and coupled to each other by spot welling or the like, at one end where the brake shoe engaging groove 11a is formed. One side wall 11c and the other side wall 11d, at the other end 11b, are spaced from each other so as to clamp the proximal end 12a of the control lever 12, and at a middle portion between opposite ends, are spaced larger than at the other end 11b. At the middle portion of the strut 11 one side wall 11c and the other side wall 11d are connected to each other integrally with an upper bridging part 11e.

The control lever 12 will now be explained in more detail. This control lever 12 is composed of a pair of planar members 12c, 12d opposed to each other. These planar members 12c, 12d are made into close contact with and coupled with each other by spot welding or the like, at a portion corresponding to the proximal end 12a of the control lever 12 to be pivotally journalled to said other end 11b of the strut 11 by the pin 15. The planar members 12c, 12d, at a portion corresponding to the free end 12e of the control lever 12, constitute opposed pieces which are spaced from each other in a bifurcated shape, as clearly shown in FIGS. 1 and 3(a), so as to define a gap 12f. The free end 12e of the control lever 12 having the gap 12f defined by the opposed pieces, is located so as to be clamped between the opposed side walls 11c, 11d which are largely spaced from each other in the middle portion of the strut 11.

The width H of the gap 12f between said opposed pieces at the free end 12e of the control lever 12, that is, the space between the planar members 12c, 12d at a portion corresponding to the free end 12e of the control lever 12 is determined as follows, with respect to end fitting 16a of a brake control cable 16 to be connected to the free end 12e of the control lever 12.

First of all, explanation will now be made of the shape of the end fitting 16a of the control cable. The end fitting 16a has, for example, a columnar shape, having one side of a length $L_1$ which is longer than the length $L_2$ of the other side as shown in FIGS. 1 and 3(a), as viewed in the longitudinal direction of the control cable 16.

Now, the width H of said gap 12f is smaller than the length $L_1$ of the one side of the end fitting 16a, but larger than the length $L_2$ of the other side, so that the end fitting 16a of the control cable can be engaged with the free end 12e of the control lever 12 in a cable pulling direction (which is indicated by arrow W), as shown in FIGS. 1 to 3.

It should be noted that the length $L_1$ of the one side of the end fitting 16a has to be smaller than the width of a space 11h between the opposed side walls 11c, 11d intermediate of the opposite ends of the strut 11, that is, the distance between the opposed side walls 11c, 11d intermediate of the opposite ends of the strut 11.

In order to engage the end fitting 16a of the control cable with the free end 12e of the control lever 12 as mentioned above, the planar members 12c, 12d are formed at portions corresponding to the free end 12e of the control lever 12, respectively, with engaging recesses 12g for engaging the end fitting 16a of the control cable having an elongated columnar shape, engaging faces of which engaging recesses 12g are curved in shape of circular arc having a curvature equal to that of the outer periphery surface of the end fitting 16a.

As shown in FIGS. 2 and 3(b), a protrusion 12h is formed on the control lever 12, intermediate between the opposite ends of the same, which protrusion 12h is adapted to abut against the bridging part 11e between the opposed side walls 11c, 11d of the strut 11 so as to limit the rotation of the control lever 12 relative to the strut 11 in a direction reverse to the control cable pulling direction W. Accordingly, in this case, the bridging part 11e of the strut 11 serves as a control lever abutting part for limiting the reverse rotation of the control lever 12 as mentioned above.

As shown in FIG. 1, there is provided a shoe return spring 17 in stretched condition between the control ends of both brake shoes 13, 14 so that the both brake shoes 13, 14 are made to abut against an anchor block 18 in the vicinity of the control ends thereof. This anchor block 18, as clearly shown in FIG. 2, is fastened to a knuckle 21 of a vehicle body together with a back plate 19 by means of a pair of bolts 20, on the heads 20a of which bolts 20 the above mentioned brake operating device 10 is installed.

With the above arrangement of the operating device 10, when a cable pulling force indicated by the arrow W shown in FIGS. 2 and 3(b) is applied to the control lever 12 though the control cable 16, the control lever 12 is rotated around the pivot pin 15 clockwise in FIG. 3(b) (counterclockwise in FIG. 2), and accordingly, the brake shoe 14 is pushed leftward in FIG. 3(b) (rightward in FIG. 2).

Meanwhile, the above mentioned rotation of the control lever 12 around the pivot pin 15 applies a reaction force to the strut 11 through the pivot pin 15, and accordingly, the strut 11 is pushed rightward in FIG. 3(b) (leftward in FIG. 2) together with the brake shoe 13.

As results of the above, the brake shoes 13, 14 are moved away from each other and are pressed against the inner peripheral surface of the brake drum which is not shown, so as to be prepared such a condition that the operation of the brake drum is started.

When the end fitting 16a of the control cable 16 is inserted from the outside of the drum brake and is engaged with the control lever 12 (in detail, the engaging recesses 12g at the free end 12e thereof) of the above mentioned brake operating device 10, the control cable 16 and its end fitting 16a are inserted into the drum brake through an opening 21a of the knuckle 21, an opening 19a of the back plate 19 and an opening 18a of the anchor block 18, and then, the control cable 16 is rotated around its own longitudinal axis to direct the end fitting 16a of the control cable such that the long side of the length $L_1$ is parallel with the planar members 12c, 12d of the control lever 12, as shown FIG. 4(a).

In this condition, the control cable 16 is pushed in the direction of the longitudinal axis thereof so that the end fitting 16a is passed through the gap 12f between the planar members 12c, 12d of the control lever 12 in the direction reverse to the cable pulling direction W, as shown in FIG. 4(b).

At this time, even though the end fitting 16a of the control cable abuts against the control lever 12, the control lever 12 is prevented from being rotated in the corresponding direction since the protrusion 12h thereof abuts against the bridging part 11e between the opposed side walls 11c, 11d of the strut 11, whereby it is possible to enhance the workability.

By the way, in this embodiment, since the control lever abutting part for limiting the rotation of the control lever 12 as mentioned above is formed of the bridging part 11e between the opposed side walls 11c, 11d of the strut 11, the strength of the strut 11 can be increased by the control lever abutting part.

FIGS. 4(a) and 4(b) show a condition in which the end fitting 16a of the control cable has been completely passed through the gap 12f between the planar members 12c, 12d as mentioned above. In this condition, the control cable 16 is rotated around its own longitudinal axis by an angle of 90 deg. as indicated by the arrow δ in FIG. 4(b), and thereafter, the control cable 16 is pulled in its pulling direction, thereby, as shown in FIGS. 1 to 3, the end fitting 16a thereof is engaged with the engaging recesses 12g at the free end 12e of the control lever 12.

By the way, the removal of the control cable 16 from the drum brake operating device 10 can be effected by carrying out the above mentioned steps in the reverse order.

It should be noted in this embodiment that, due to the above mentioned arrangement in which the cable connection to the drum brake operating device 10 can be effected as mentioned above by steps of rotating the control cable 16 around its own longitudinal axis to direct the end fitting 16a thereof such that the long side of the length $L_1$ is parallel with the planar members 12c, 12d of the control lever 12, and of pushing the control cable 16 in the direction of the longitudinal axis thereof so that the end fitting 16a is passed through the gap 12f of the control lever 12, and of rotating the control cable 16 around its own longitudinal axis by an angle of 90 deg. So that the end fitting 16a thereof can be engaged with the free end 12e of the control lever 12, the cable connection to or disconnection from the free end 12e of the control lever 12 can be carried out by passing the end fitting 16a through the gap 12f formed in the control lever 12 itself, so that it is possible to eliminate the necessity of the provision of a gap defined between the free end 12e of the control lever 12 and the inner end wall 11f of the strut 11, and further, it is possible to eliminate the necessity of blocking such a gap with an additional component for preventing the end fitting 16a from disengaging.

For the above, it is possible in this embodiment to solve such problems as mentioned above inherent to the conventional device that the overall length of the drum brake operating device 10 become longer and that it is economically disadvantageous.

Further, for engagement or disengagement of the end fitting 16a of the control cable, it is only required that the control cable 16 is held by the hand to engage or disengage the end fitting 16a with or from the drum brake operating device 10, and that the control cable 16 is rotated around its longitudinal axis by an angle of 90 deg., without necessity of such working that components other than the control cable 16 and the end fitting 16a thereof are elastically deformed, so that it is possible to exhibit also such functional effects and advantages that the engagement and the disengagement of the end fitting 16a of the control cable can be facilitated.

Figure 5:
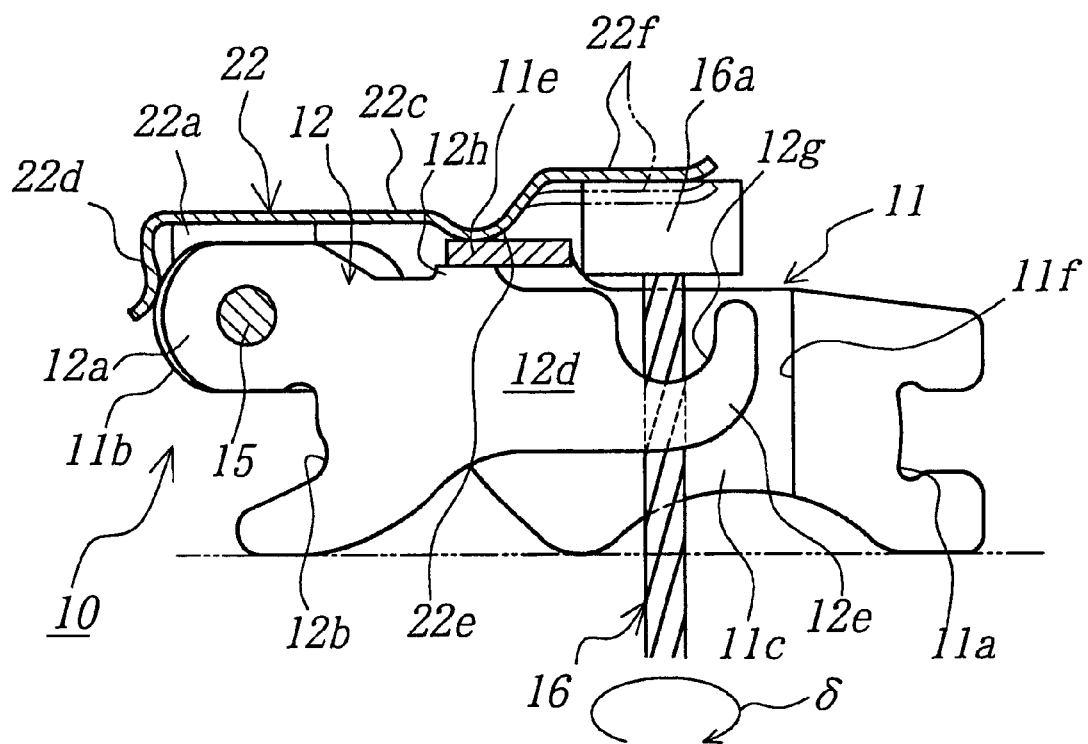
FIG. 5 is a longitudinally sectional side view, similar to FIG. 4(b), illustrating a drum brake operating device incorporating a device for connecting a control cable according to another embodiment of the present invention.
Figure 6:
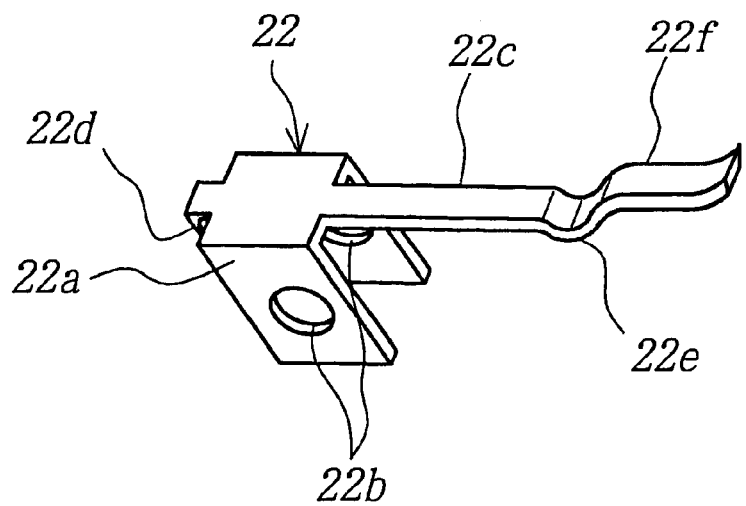
FIG. 6 is a perspective view illustrating an elastic stopper in detail, which is used in the embodiment in FIG. 5.

FIG. 5 shows a device for connecting a control cable according to another embodiment of the present invention. In this embodiment, an elastic stopper 22 which is shown in FIG. 6 entirely in large scaled, is added to the above mentioned embodiment.

This elastic stopper 22 has a U-shaped base part 22a having a pair of opposed legs which are formed with aligned holes 22b so that the base part 22a is supported by means of the above mentioned pivot pin 15 inserted into the aligned holes 22b. The elastic stopper 22 is also integrally incorporated with a stopper piece 22c extending from the U-shaped base part 22a toward the free end 12e of the control lever 12, and with a restraint piece 22d extending from the U-shaped base part 22a toward the end part 11b of the strut 11.

The stopper piece 22c is extended up to a position above the gap 12f shown in FIG. 3(a) in the free end 12e of the control lever 12, which stopper piece 22c is formed at its middle portion with a curved protrusion 22e adapted to contact with the bridging part 11e of the strut 11. When the curved protrusion 22e contact with the bridging part 11e of the strut 11, the restraint piece 22d abuts against the end part 11b of the strut 11 so as to hold the resilient stopper 22 in an attached condition shown in FIG. 5. Accordingly, the bridging part 11e of the strut 11 acts also as a stopper support portion.

In such attached condition of the elastic stopper 22, the front end 22f of the stopper piece 22c overhangs above the gap 12f, shown in FIG. 3(a), in the free end 12e of the control lever 12, free shape of which front end 22f may be as shown by the solid line in FIG. 5 which receives the end fitting 16a of the control cable just after completely passed through the gap 12f, or may be as shown by the two-dot chain line in FIG. 5 which receives the end fitting 16a of the control cable just before completely passed through the gap 12f.

Anyway, in the embodiment in which such an elastic stopper 22 is added, the end fitting 16a of the control cable, upon passing through the gap 12f shown in FIG. 3(a), abuts against the front end 22f of the stopper piece 22c of the elastic stopper 22 and a worker can sensibly recognize from this situation that the end fitting 16a has been passed through the gap 12f.

Accordingly, the worker on the basis of such recognition can carry out the next step of rotating the control cable 16 around its longitudinal axis by an angle of 90 deg. for engagement of the end fitting 16a with the free end of the control lever.

When the front end 22f of the stopper piece 22c of the stopper 22 has the free shape indicated by the two-dot chain line in FIG. 5, the end fitting 16a of the control cable, upon passing through the gap 12f of the control lever 12 as shown in FIG. 3(a), elastically deforms the front end 22f of the stopper piece 22c of which the curved protrusion 22e is slightly floated up from the bridging part 11e (the stopper support portion).

Accordingly, when the hand is released from the control cable 16 after the rotation of the control cable 16 around its longitudinal axis by an angle of 90 deg. to engage the end fitting 16a of the control cable with the free end 12e of the control lever 12, the front end 22f of the stopper piece 22c causes the curved protrusion 22e to resiliently abut against the bridging part 22e to generate sound.

The worker, on the basis of this sound, can sensibly recognize the completion of the engagement of the end fitting 16a of the control cable with the free end 12e of the control lever 12.

Figure 7A:
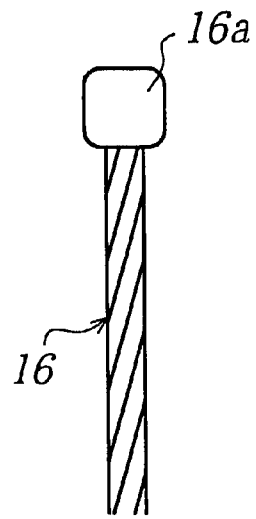
FIG. 7 designates a variant of the end fitting of the control cable;
   (a) is an end view thereof; and
   (b) is a front view of the same.
Figure 7B:
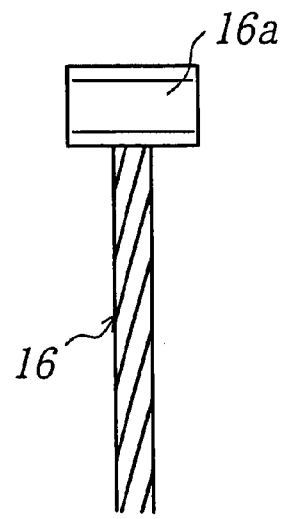
Figure 8A:
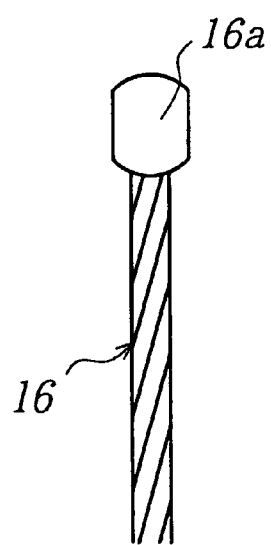
FIG. 8 designates another variant of the end fitting of the control cable;
   (a) is an end view thereof; and
   (b) is a front view of the same.
Figure 8B:
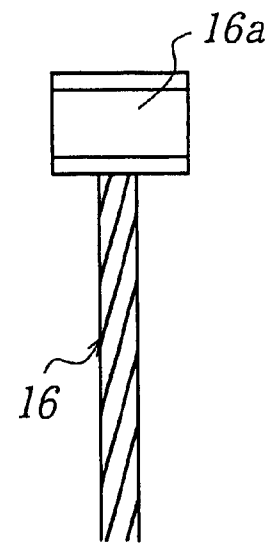

Although the end fitting 16a of the control cable is formed in a columnar shape in the above mentioned embodiments, it should not be limited to this shape and, as shown in FIGS. 7(a), and 7(b), may have a shape of pillar having a rectangular cross-section with rounded corners, or, as shown in FIGS. 8(a) and 8(b), a shape of pillar having a circular cross-section with a pair of opposed flat surfaces.

In the case of the shape shown in FIGS. 8(a) and 8(b), in particular, the width H of the gap 12f can be decreased to reduce the maximum width of the control lever 12.

However, even in such a case that the end fitting 16a of the control cable is formed into any of various pillar shapes, it is preferable that the engaging recesses 12g formed, for engaging the end fitting 16a, in the free end 12e of the control lever 12 have circular arc surfaces, since the end fitting 16a can be freely slid in the recesses 12g in the direction of circular arc, and accordingly, no local bending stress is exerted on the control cable 16 even during rotation of the control lever 12 by pulling the control cable 16, thereby it is possible to enhance the durability of the control cable 16.

Figure 9:
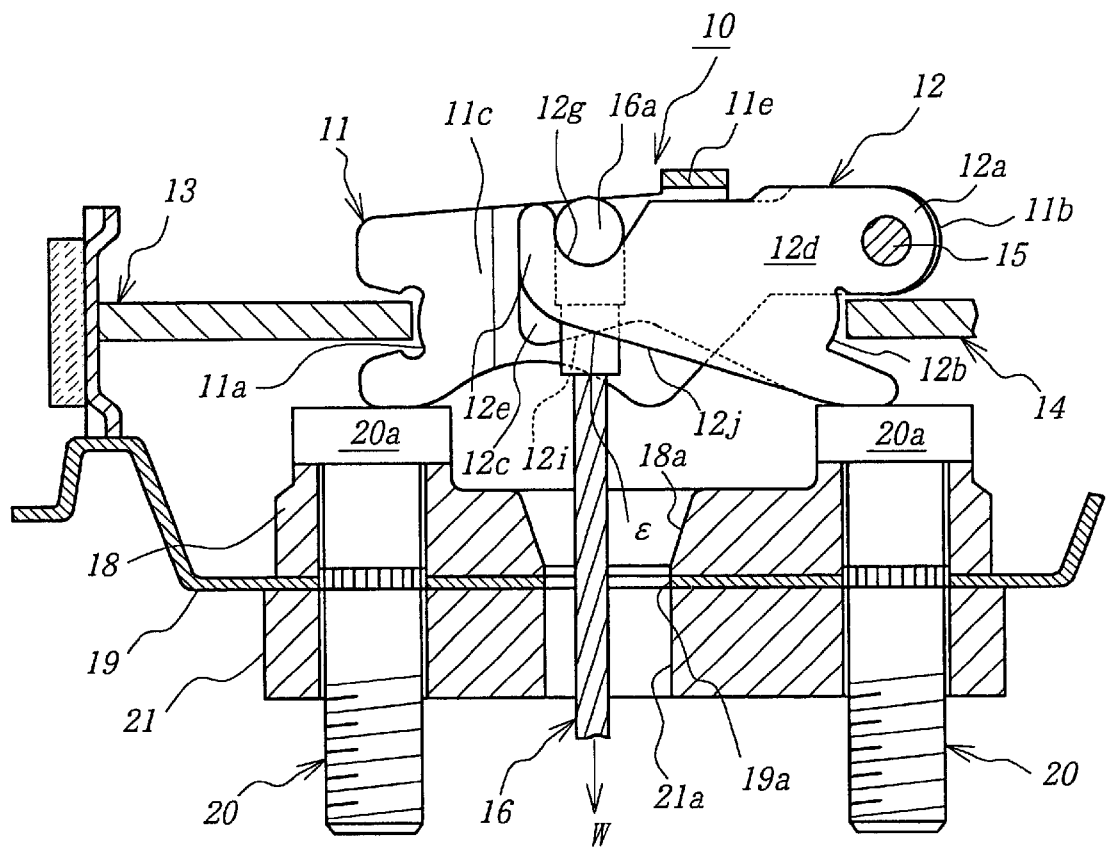
FIG. 9 is a longitudinally sectional side view illustrating an essential part of a drum brake, similar to FIG. 2, which shows a drum brake operating device incorporating a device for connecting a control cable according to a further another embodiment of the present invention.

FIG. 9 shows, in same cross-section as FIG. 2, a drum brake operating device 10 incorporating a device for connecting a control cable according to a further another embodiment of the present invention. But, since this drum brake operating device 10 is basically similar to the above mentioned embodiment shown in FIGS. 1 to 4, parts like to those shown in these figures are denoted by use of the same reference numerals and those multiple explanation are avoided.

In this embodiment, the following arrangement is employed in order to facilitate said working that the end fitting 16a of the control cable 16 is engaged with the control lever 12 in the drum brake operating device 10 (in detail, the engaging recesses 12g formed on the free end 12e of the control lever 12) by inserting the end fitting 16a of the control cable 16 from the outside of the drum brake through the opening 21a of the knuckle 21, the opening 19a of the back plate 19, and the opening 18a of the anchor block 18.

Outer edges 12i, 12j of the planar members 12c, 12d spaced from each other and forming the free end 12e of the control lever 12 on the side in the cable pulling direction (W) are inclined reverse to each other, so as to cross each other as indicated by ∈ as viewed in the direction of the rotational axis of the control lever 12 (the axial direction of the pin 15).

In this case, the position ∈ where the inclined outer edges 12i, 12j of the planar members 12c, 12d cross each other, is aligned in the axial direction of the control cable 16 with the engaging position of the end fitting 16a of the control cable with respect to the free end 12e of the control lever 12 (in detail, engaging recesses 12g thereof).

In accordance with this device for connecting a control cable, when the end fitting 16a is inserted into the drum brake through the openings 21a, 19a, 18a with holding the control cable 16 by hand in order to engage the end fitting 16a with the free end 12e of the control lever 12 (in detail, the engaging recesses 12g thereof), even if the end fitting 16a of the control cable is at a rotational position around the cable axis as shown in FIG. 10(a) to direct so that it interferes with the outer edges 12i, 12j of the planar members 12c, 12d forming the free end 12e of the control lever 12, only pressing the end fitting 16a of the control cable against the outer edges 12i, 12j makes it possible that the end fitting 16a of the control cable is exerted a rotational force around the cable axis due to the above inclinations of the outer edges 12i, 12j, and accordingly, that the end fitting 16a of the control cable is rotated as shown in FIG. 10(b) in a direction which is determined by the inclined directions of the outer edges 12i, 12j.

For the above, the end fitting 16a of the control cable is finally rotated around the cable axis as shown in FIG. 10(c) to take a rotational position shown in FIG. 4 where the long side of the length $L_1$ (refer to FIG. 1) is parallel with the planar members 12c, 12d of the control lever 12.

In this condition, the end fitting 16a of the control cable can be passed through the gap 12f (refer to FIG. 1) between the planar members 12c, 12d in a direction reverse to the cable pulling direction, as shown in FIG. 10(c).

After this passing of the end fitting 16a of the control cable, it is rotated about the cable axis by an angle of 90 deg. with holding the control cable 16 by hand, and in this condition, the control cable 16 is pulled in the cable pulling direction W to engage the end fitting 16a of the control cable with the free end 12e of the control lever 12 (in detail, the engaging recesses 12g thereof) as shown in FIG. 9.

It should be noted in accordance with the present embodiment that when the end fitting 16a of the control cable, upon engagement with the free end 12e of the control lever 12 (in detail, the engaging recesses 12g thereof), will be passed through the gap 12f (refer to FIG. 1) formed at the free end 12e of the control lever 12, in the direction reverse to the cable pulling direction, only pressing the end fitting 16a of the control cable against the inclined outer edges 12i, 12j of the planar members 12c, 12d is required to rotate the end fitting 16a of the control cable around the cable axis in such position that the long side of the length $L_1$ is parallel with the planar members 12c, 12d of the control lever 12.

Therefor, a worker should not bring the end fitting 16a of the control cable to the above rotational position, which makes it possible to facilitate the insertion of the end fitting 16a of the control cable into the gap 12f (refer to FIG. 1)

formed on the free end 12e of the control lever 12, thereby making the workability to be enhanced.

Further, in this embodiment, since the inclined outer edges 12i, 12j of the planar members 12c, 12d in the free end 12e of the control lever 12 cross with each other, as viewed in the direction of the rotational axis of the control lever 12, at the position ε where align, in the direction of the axis of the cable, with the engaging position of the end fitting 16a of the control cable with respect to the free end 12e of the control lever 12, it is possible to eliminate the necessity of transverse displacement of the end fitting 16a of the control cable for aligning the same with the engaging position with respect to the free end 12e of the control lever 12 (in detail, the engaging recesses 12g thereof) after the end fitting 16a of the control cable has been passed through the gap 12f (refer to FIG. 1) in the free end 12e of the control lever 12.

Accordingly, also in view of this point, it is possible to enhance the workability of the connection of the control cable 16.

FIG. 11 shows a still another embodiment of the present invention, which makes it possible to eliminate the necessity of the above mentioned rotation of the end fitting 16a of the control cable around the cable axis after the end fitting 16a of the control cable is passed through the gap 12f (refer to FIG. 1) in the free end 12e of the control lever 12, thereby enhancing the workability of the connection of the control cable.

To this end, there is provided on the control cable 16 a retainer 27 of a shape identical with that of the end fitting 16a of the control cable shown in FIGS. 1 to 3, but the retainer 27 is of a size larger than that of the end fitting 16a of the control cable as follows.

The retainer 27 has a long side of length $L_4$ shown in FIG. 11(d) which corresponds to the length $L_1$ (refer to FIG. 1) of said one side of the end fitting 16a of the control cable and which is determined so that it cannot pass through the space 11h (refer to FIG. 1) between the opposed side walls 11c, 11d of the strut 11, and has a short side of length $L_5$ shown in FIG. 11(a) which corresponds to the length $L_2$ (refer to FIG. 1) of said other side of the end fitting 16e of the control cable and which is determined so that it can pass through the gap 11h (refer to FIG. 1) between the opposed side walls 11c, 11d of the strut 11 but cannot pass through the gap 12f (refer to FIG. 1) in the free end 12e of the control lever 12.

It is noted that the retainer 27 preferably may have the same shape as that of the end fitting 16a of the control cable shown in FIGS. 1 to 3 for the sake of convenience in designing and manufacturing, but it is not always necessary to have this shape, and it may have any of various shapes which fulfills the above mentioned dimensional relationship.

The above retainer 27 is fitted on a rectangular cross sectional part 16c so as to be slidable in the axial direction of the cable while maintaining in the rotational position orthogonal to the end fitting 16a of the control cable, which rectangular cross sectional part 16c may be integrally incorporated with the end fitting 16a of the control cable or may be attached on the control cable 16. The retainer 27 is also urged towards the end fitting 16a of the control cable by means of a spring 28 so as to be resiliently contact with it.

Furthermore, outer edges 11i, 11j of the opposed side walls 11c, 11d on the side in cable pulling direction are inclined in directions reverse to each other at the intermediate portions between the opposite ends of the strut 11 so that the outer edges 11i, 11j of the opposed side walls 11c, 11d cross each other as indicated by γ as viewed in the direction of the rotational axis of the control lever 12 (the axial direction of the pin 15), which cross position γ is aligned with the engaging recesses 12g of the control lever 12 in the axial direction of the cable.

According to this arrangement, when the end fitting 16a of the control cable is inserted in the gap 12f (refer to FIG. 1) in the free end 12e of the control lever 12, as shown in FIG. 11(a), the retainer 27 orthogonal to the end fitting 16a of the control cable interferes with the inclined outer edges 11i, 11j of the opposed side walls 11c, 11d of the strut 11.

As the end fitting 16a of the control cable is entered into the gap 12f in the free end 12e of the control lever 12 as shown in FIG. 11(b), the spring 28 is compressed to increase the pressing force to the retainer 27 against the inclined outer edges 11i, 11j of the opposed side walls 11c, 11d of the strut 11. Thus, when the end fitting 16a of the control cable has been passed through the gap 12f (refer to FIG. 1) in the free end 12e of the control lever 12 as shown in FIG. 11(c), the retainer 27 is exerted with a rotational force around the cable axis by the inclined outer edges 11i, 11j of the opposed side walls 11c, 11d of the strut 11 and the retainer 27 occupy the rotational position where it can enter the space 11h (refer to FIG. 1) between the opposed side walls 11c, 11d of the strut 11.

The above rotation of the retainer 27 around the cable axis causes the end fitting 16a of the control cable to rotate around the cable axis by an angle of 90 deg. as shown in FIG. 11(d). As a result of this the end fitting 16a of the control cable is at the rotational position where it can be engaged with the engaging recesses 12g of the free end of the control lever 12.

At this time, as shown in FIG. 11(d), the retainer 27 enters the space between the opposed side walls 11c, 11d of the strut, and abuts against the outer edges of the free end 12e of the control lever 12, and then the end fitting 16a of the control cable falls into the engaging recesses 12g of the control lever 12 to engaged with the free end 12e of the control lever 12. Sound generated at this time enables the worker to know the completion of the connection of the cable.

In accordance with this embodiment, when the end fitting 16a of the control cable has been completely passed through the gap 12f (refer to FIG. 1) in the free end 12e of the control lever 12, the end fitting 16a of the control cable is automatically rotated by an angle of 90 deg. into the rotational position to be able to be engaged with the recesses 12g of the control lever 12, by means of the retainer 27 cooperating with the inclined outer edges 11i, 11j of the opposed side walls 11c, 11d of the strut 11. Accordingly, it is possible to eliminate the necessity of the working for rotating the free end 12e of the control lever 12 into said rotational position after it has been passed through the gap 12f (refer to FIG. 1) in the free end 12e of the control lever, thereby being capable of simplifying the connection of the control cable.

Additionally in this embodiment, the free end 12e of the control lever 12 is clamped between the end fitting 16a of the control cable and the retainer 27 by the resilient force of the spring 28 upon carrying out the connection of the control cable 16 with the free end 12e of the control lever 12, and therefor, it is possible to prevent the connection part of the cable from rattling and disengaging.

Although it has not been shown in the drawings, the control lever 12 in the arrangement shown in FIGS. 11(a) to 11(d) may be altered by applying to it the structure as mentioned above with regard to FIGS. 9 and 10, in which the outer edges 12i, 12j of the spaced planar members 12c, 12d constituting the free end 12e of the control lever 12 are inclined in the direction reverse to each other so as to cross each other as viewed in the direction of the rotational axis of the control lever.

In this case, upon engaging the end fitting 16a of the control cable with the free end 12e of the control lever 12 (in detail, the engaging recesses 12g thereof), even though the end fitting 16a of the control cable occupies the rotational position about the cable axis where it interferes with the outer edges 12i, 12j of the planar members 12c, 12d constituting the free end 12e of the control lever 12, the end fitting 16a of the control cable is able to be automatically rotated by an angle of 90 deg. due to the inclination of outer edges 12i, 12j to take the rotational position at which it can enter into the gap 12f (refer to FIG. 1) between the planar members 12c, 12d in the free end 12e of the control lever 12.

Accordingly, in this case, the necessity of setting the end fitting 16a of the control cable to the above rotational position can also be eliminated, thereby being more enhanced the workability of the connection of the cable.

In FIGS. 11(a) to 11(d), the retainer 27 is fitted on the control cable 16 slidably in the axial direction thereof while maintaining the rotational position orthogonal to the end fitting 16a, but instead of this arrangement, the retainer 27, although it is not shown in the drawings, may be integrally incorporated with the rectangular cross sectional part 16c attached on the end fitting 16a or the control cable 16 so as to keep a distance between the retainer 27 and the end fitting 16a a predetermined constant value.

Also in this case, the retainer 27 is set to occupy a rotational position orthogonal to the end fitting 16a of the control cable, but particularly, the above constant distance between the retainer 27 and the end fitting 16a is determined so that the retainer 27 abuts against the inclined outer edges 11i, 11j of the opposed side walls 11c, 11d of the strut 11 just after the end fitting 16a of the control cable has been completely passed through the gap 12f (refer to FIG. 1) in the free end 12e of the control lever 12.

Also in this arrangement, the end fitting 16a of the control cable is passed through the gap 12f (refer to FIG. 1) in the free end 12e of the control lever 12 until the retainer 27 abuts against the inclined outer edges 11i, 11j of the opposed side walls 11c, 11d of the strut 11, and thereafter, the retainer 27 is only pressed against the inclined outer edges 11i, 11j of the opposed side walls 11c, 11d of the strut 11 to cause the rotation of the retainer 27 together with the end fitting 16a of the control cable around the cable axis by an angle of 90 deg., thereby being able to eliminate the necessity of setting the end fitting 16a of the control cable at the rotational position where it can engaged with the free end 12e of the control lever 12 after the end fitting 16a of the control cable is passed through the gap 12f (refer to FIG. 1) in the free end 12e of the control lever.

It should be noted in the arrangement in which the retainer 27 is fixed as mentioned above that, when the retainer 27 abuts against the outer edges 11i, 11j of the opposed side walls 11c, 11d of the strut 11, a worker can sensibly recognize such a fact that the end fitting 16a of the control cable has been completely passed through the gap 12f (refer to FIG. 1) in the free end 12e of the control lever 12.

Thus, if it is required to rotate the end fitting 16a of the control cable around the cable axis by an angle of 90 deg. after the end fitting 16a of the control cable has been completely passed through the gap 12f (refer to FIG. 1) in the free end 12e of the control lever 12 since the outer edges 11i, 11j of the opposed side walls 11c, 11d of the strut 11 are not inclined, a worker can carry out the above mentioned rotation of the end fitting 16a with confidence on the basis of the above recognition.

FIGS. 12 to 15 show a variant form of the embodiment, which is adapted to attain, with use of another means, the functional effects and advantages similar to those according to the embodiment shown in FIG. 11.

Figure 12C:
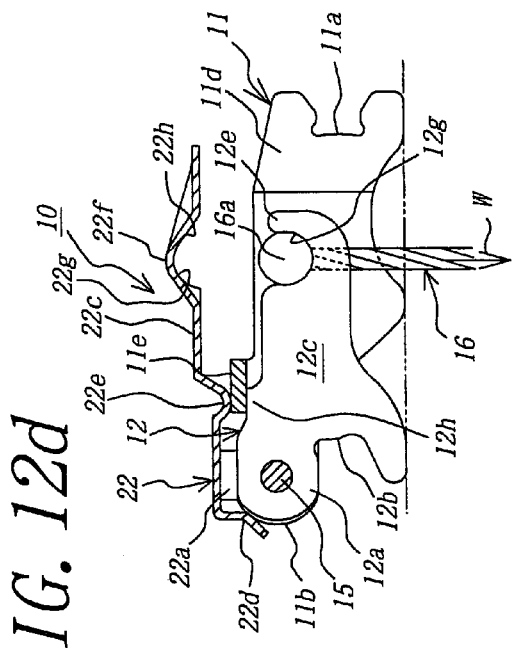
Figure 12D:
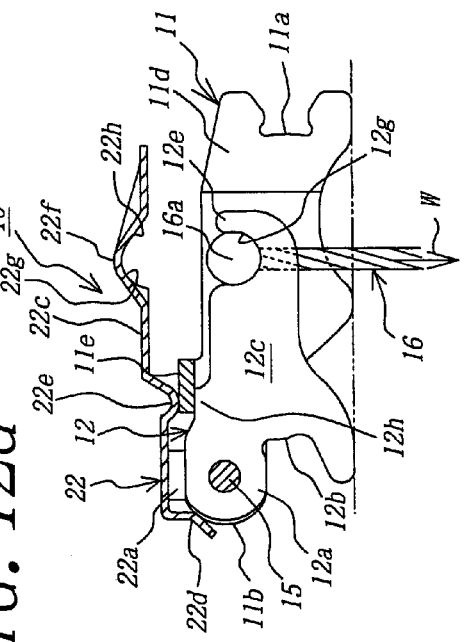

In other words, when the end fitting 16a of the control cable at such a rotational position shown in FIGS. 12(a), 12(b) that the long side of the length $L_1$ is parallel with the planar members 12c and 12d of the control lever 12 is inserted in the gap 12f (refer to FIG. 1) between the planar members 12c, 12d in the direction W' reverse to the cable pulling direction, the end fitting 16a of the control cable is able to be automatically rotated around the cable axis by an angle of 90 deg., and therefor, the end fitting 16a of the control cable can be engaged with the free end 12e of the control lever 12 (in detail, the engaging recesses 12g thereof) only by pulling the control cable 16 in the cable pulling direction W as shown in FIG. 12(d), without requesting the rotating operation of the end fitting 16a into said rotational position.

To this end, in this embodiment, there is provided a stopper 22 as clearly shown in FIG. 13 in the operating device 10.

This stopper 22 is basically identical with that shown in FIGS. 5 and 6, which stopper 22 is provided with the U-shaped base part 22a having a pair of opposed leg parts formed with the aligned holes 22b. The above mentioned pivot pin 15 is inserted through the aligned holes 22b so as to attach the stopper 22 to the operating device 10, in more detail, to the strut 11 therein.

In this attached condition of the stopper 22, the curved protrusion 22e formed at the intermediate portion of the stopper piece 22c extending from the U-shaped base part 22a toward the free end 12e of the control lever 12 is made into contact with the bridging part 11e of the strut 11, and in addition, the restraint piece 22d extending from the U-shaped base part 22a of the stopper 22 toward the other end 11b of the strut 11 abuts against the extremity of the other end of the strut 11, thereby it is possible to hold the stopper 22 in the attached condition shown in FIG. 12.

In this embodiment, the front end 22f of the stopper piece 22c overhanging above the free end 12e of the control lever 12 in the attached condition of the stopper 22 is formed as follows.

The front end 22f of the stopper piece 22c is formed in shape of an downwardly opened concave having inclined surfaces (end fitting abutment surfaces) 22g, 22h for receiving the end fitting 16a of the control cable 16 as shown in FIG. 12(c) after it has been passed through the gap 12f (refer to FIG. 1) in the free end 12e of the control lever 12. These inclined surfaces 22g, 22h are further inclined reverse to each other also in a direction perpendicular to the plane of FIG. 12 as shown in FIGS. 14 and 15 so that inclined surfaces 22g, 22h are finally adapted to form a twisted surface.

Figure 13A:
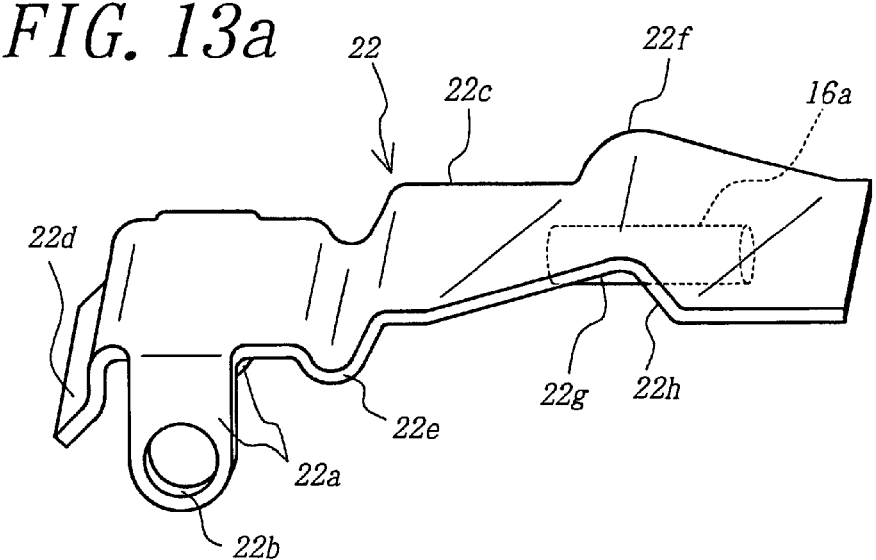
FIG. 13 is perspective views illustrating the stopper used in the example shown in FIG. 12.
Figure 13B:
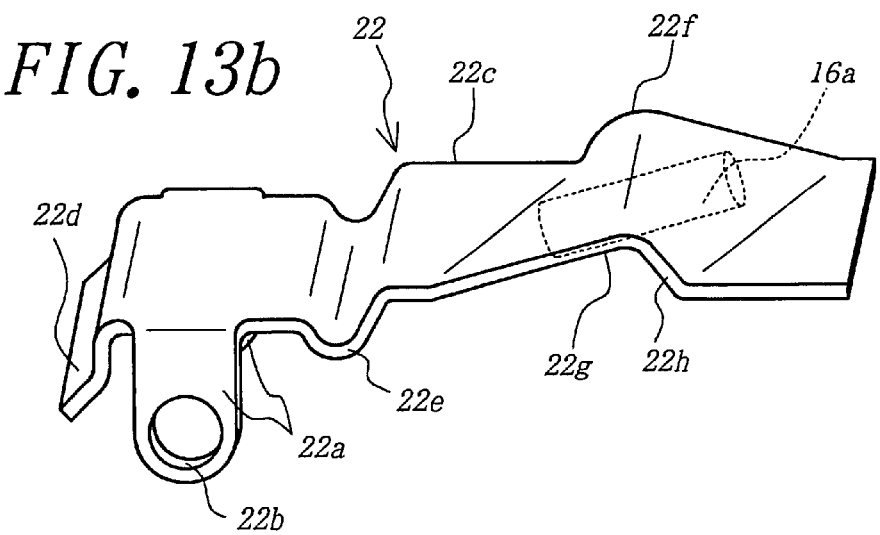
Figure 13C:
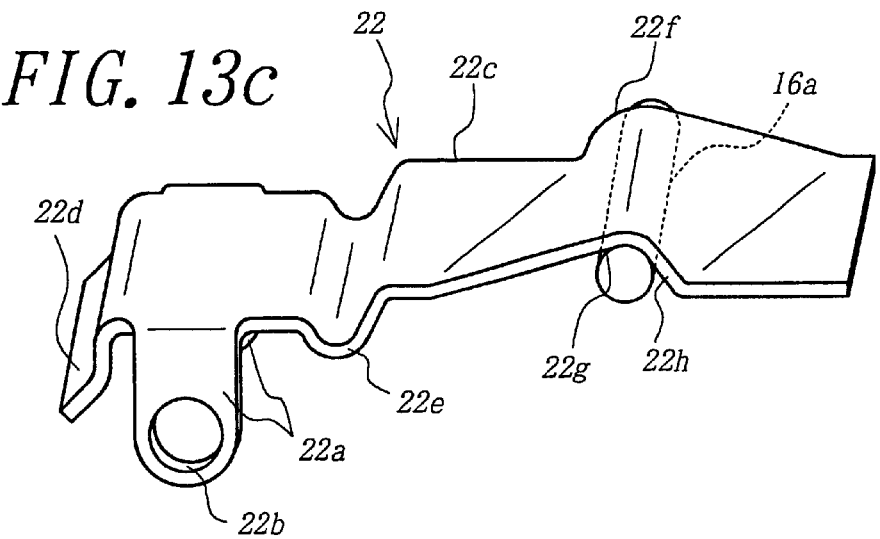

Thus, when the end fitting 16a of the control cable has been passed through the gap 12f (refer to FIG. 1) in the free end 12e of the control lever 12 to abut against the twisted surface 22g, 22h as shown in FIGS. 12(b) and 13(a), this twisted surface 22g, 22h can exert on the opposite ends of the end fitting 16a of the control cable respectively, a component force in the same direction around the cable axis which are shown by Y and Z in FIGS. 14 and 15. Accordingly, the twisted surface 22g, 22h causes the end fitting 16a of the control cable automatically to be rotated around the cable axis by an angle of 90 deg. through the rotational position shown in FIG. 13(b) into the rotational position shown in FIGS. 12(c) and 13(c).

According to this arrangement in which the end fitting 16a of the control cable, upon having been passed through the free end 12e of the control lever 12, abuts against the twisted surface 22g, 22h of the stopper 22 to be automatically rotated around the cable axis by an angle of 90 deg., the end fitting 16a of the control cable can be engaged with the free end 12e of the control lever 12 only by pulling the control cable 16 in the pulling direction (W) thereof as shown in FIG. 12(d), without necessity of rotating the end fitting 16a of the control cable around the cable axis by an angle of 90 deg. after it has been inserted through the free end 12e of the control lever 12.

It should be noted that the stopper 22 as shown in FIGS. 12 and 13 can be also added to the operating device 10 shown in FIG. 9. According to such construction, in addition to said advantages which it is possible to eliminate the necessity of the step of rotating the end fitting 16a of the control cable around the cable axis by an angle of 90 deg. So as to extend the long side (having the length $L_1$) thereof in parallel with the planar members 12c, 12d of the control lever 12, prior to the insertion of the end fitting 16a of the control cable into the free end 12e of the control lever 12, there can be attained a further additional advantages which it is also possible to eliminate the necessity of the step of rotating the end fitting 16a of the control cable around the cable axis by an angle of 90 deg. So as to extend the short side (having the length $L_2$) thereof in parallel with the planar members 12c, 12d of the control lever 12, after the insertion of the end fitting 16a of the control cable into the free end 12e of the control lever 12. In this case, it is possible to more enhance the workability of the connection of the cable.

What is claimed is:

1. A device for connecting a control cable for use in an operating mechanism in which one of members to be operated is engaged with one end of a strut, and the other one of members to be operated is engaged with a control lever pivotally journalled to the other end of the strut, in the vicinity of the pivotally journalled portion of the control lever, an end fitting of the control cable being engaged with a free end of the control lever in a cable pulling direction, and the control lever and the strut being rotated relative to each other around the pivotally journalled portion by pulling the control cable, so as to move said both members to be operated, away from each other, characterized in that:

said end fitting of the control cable having such a shape that the length of one side is longer than that of the other, as viewed in the longitudinal direction of the control cable;

said free end of the control lever having a gap through which the length of said other side of the end fitting of the control cable can pass but the length of said one side thereof cannot pass; and the end fitting of the control cable is passed through the gap in a direction reverse to the cable pulling direction, and then, the control cable is rotated by an angle of 90 deg. around its longitudinal axis so as to engage the end fitting of the control cable with the free end of the control lever in the cable pulling direction.

2. A device for connecting a control cable as set forth in claim 1, characterized in that said control lever is composed of a pair of planar members opposed to each other, which planar members are coupled with each other at a portion corresponding to the proximal end of the control lever to be pivotally journalled to said other end of the strut, and which planar members are spaced from each other at a portion corresponding to the free end of the control lever so as to define said gap.

3. A device for connecting a control cable as set forth in claim 1, characterized in that said strut is provided with a control lever abutting part for limiting rotation of the control lever, relative to the strut, in the direction reverse to the cable pulling direction.

4. A device for connecting a control cable as set forth in claim 3, characterized in that said strut has opposed side walls between which the free end of said control lever is interposed on the opposite sides in the direction of the rotating axis of the control lever, and said strut has a bridging part connecting these opposed side walls, which bridging part serves as the said control lever abutting part.

5. A device for connecting a control cable as set forth in claim 1, characterized in that said end fitting of the control cable is composed of a columnar member laid transversely and coupled to the end of the control cable, and the engaging face formed on the free end of the control lever so as to receive the end fitting of the control cable has a circular arc surface.

6. A device for connecting a control cable as set forth in claim 1, characterized in that outer side edges of opposed pieces defining the gap at the free end of said control lever, on the side in the cable pulling direction, are inclined in directions reverse to each other, so that said outer side edges of the opposed pieces at the free end of said control lever cross each other as viewed in the direction of the rotational axis of the control lever, whereby, even at a rotational position of the end fitting around the cable axis such that it interferes with said outer side edges of the opposed pieces, when the end fitting is pushed in the direction reverse to the cable pulling direction, the end fitting is subjected to a rotating force around the cable axis due to the inclination of said outer side edges so as to be set in rotational position at which the end fitting can pass through said gap.

7. A device for connecting a control cable as set forth in claim 6, characterized in that the position where the outer edges of the opposed pieces cross with each other as viewed in the direction of the rotational axis of the control lever, is aligned with the engaging position of the end fitting of the control cable with respect to the free end of the control lever in the axial direction of the cable.

8. A device for connecting a control cable as set forth in claim 1, characterized in that said strut has opposed side walls between which the free end of the control lever is interposed on opposite sides in the direction of the rotational axis of the control lever, said control cable is provided with a retainer arranged to cross at right angle relative to the end fitting of the control cable as viewed in direction of cable axis, said retainer having a long side which corresponds to said one side of the end fitting of the control cable and which has a size that cannot pass through a space between said opposed side walls of the strut, and having a short side which corresponds to said other side of the end fitting of the control cable and which has a size that can pass through said space but cannot pass through the gap at the free end of the control lever, and said end fitting of the control cable is passed through the gap at the free end of the control lever in the direction reverse to the cable pulling direction, said retainer is caused to abut against the outer edges of the opposed side walls of the strut, and then the control cable is rotated around its longitudinal axis by an angle of 90 deg. so as to engage the end fitting of the control cable with the free end of the control lever in the cable pulling direction.

9. A device for connecting a control cable as set forth in claim 8, characterized in that the outer edges of the opposed side walls of the strut, on the side in the cable pulling direction, are inclined at a substantially middle portion between the opposite ends of the strut, in directions reverse to each other so as to cross one another as viewed in the direction of the rotational axis of the control lever, whereby, even at a rotational position around the cable axis such that the retainer interferes with the outer side edges of the opposed side walls of the strut, when the retainer is pushed in the direction reverse to the cable pulling direction, the retainer is subjected to a rotational force around the cable axis due to the inclination of said outer side edges of the opposed side walls of the strut so as to be fitted into said space of the strut, whereby the end fitting of the control cable is set in rotational position at which it can be engaged with the free end of the control lever.

10. A device for connecting a control cable as set forth in claim 9, characterized in that the position at which the outer side edges of the opposed side walls of the strut cross each other as viewed in the direction of the rotational axis of the control lever is aligned with the engaging position of the end fitting of the control cable with respect to the free end of the control lever, in the axial direction of the cable.

11. A device for connecting a control cable as set forth in claim 8, characterized in that said retainer is fitted on the control cable so as to be slidable in the axial direction of the cable while remaining the rotational position so as to be orthogonal to the end fitting of the control cable, and said retainer is urged toward the end fitting of the control cable.

12. A device for connecting a control cable as set forth in claim 1, characterized in that there is provided with a stopper against which the end fitting of the control cable abuts upon passing of the end fitting of the control cable through the gap at the free end of the control lever, whereby the worker can sense the passing of the end fitting of the control cable.

13. A device for connecting a control cable as set forth in claim 12, characterized in that said stopper is composed of an elastic stopper, whereby the end fitting of the control cable deforms the elastic stopper to be floated up from a stopper support portion formed on the strut, when the end fitting of the control cable is passed through said gap and abuts to the elastic stopper.

14. A device for connecting a control cable as set forth in claim 12 characterized in that a receiving surface of said stopper for the end fitting of the control cable is formed into a twisted surface which can exert a rotational force around the cable axis to the end fitting of the control cable so that the end fitting of the control cable comes into a rotational position where it can be engaged with the free end of the control lever.

* * * * *